(12) United States Patent
Eberle et al.

(10) Patent No.: US 11,299,008 B2
(45) Date of Patent: Apr. 12, 2022

(54) FLUID LINE SYSTEM FOR GUIDING FLUID, IN PARTICULAR FOR A MOTOR VEHICLE, AND AIR CONDITIONING DEVICE FOR A MOTOR VEHICLE, IN PARTICULAR A HVAC DEVICE

(71) Applicant: Mahle International GmbH, Stuttgart (DE)

(72) Inventors: Daniel Eberle, Stuttgart (DE); Florian Klein, Bad Liebenzell-Moettlingen (DE); Anja Reiter, Schorndorf (DE); Oliver Schultze, Stuttgart (DE); Walter Wolf, Oppenweiler-Zell (DE)

(73) Assignee: Mahle International GmbH

( * ) Notice: Subject to any disclaimer, the term of this patent is extended or adjusted under 35 U.S.C. 154(b) by 83 days.

(21) Appl. No.: 16/858,579

(22) Filed: Apr. 24, 2020

(65) Prior Publication Data

US 2020/0338954 A1    Oct. 29, 2020

(30) Foreign Application Priority Data

Apr. 25, 2019    (DE) .......................... 102019205938.4

(51) Int. Cl.
*B60H 1/00*    (2006.01)

(52) U.S. Cl.
CPC ..... *B60H 1/00557* (2013.01); *B60H 1/00007* (2013.01); *B60H 1/00585* (2013.01); *B60H 1/00735* (2013.01); *F25B 2700/00* (2013.01)

(58) Field of Classification Search
CPC ............ B60H 1/00007; B60H 1/00557; B60H 1/00585; B60H 1/00735; F25B 2700/00
See application file for complete search history.

(56) References Cited

U.S. PATENT DOCUMENTS

| 6,296,284 B1* | 10/2001 | Weischedel ........ B60H 1/00528 220/345.3 |
| 7,607,888 B2* | 10/2009 | Hori ................... B60H 1/00528 415/214.1 |

(Continued)

FOREIGN PATENT DOCUMENTS

DE    102012203351 A1    9/2013

*Primary Examiner* — Marc E Norman
(74) *Attorney, Agent, or Firm* — Fishman Stewart PLLC

(57) ABSTRACT

The present invention relates to a fluid line system (10) for guiding fluid, in particular for a motor vehicle. The fluid line system (10) comprises a sensor device (20) for capturing sensor parameters and a housing (30), which has two or more housing parts (40, 60). Each housing part (40, 60) has a mounting surface area (50, 70) for arranging a further housing part (40, 60). The housing (30) further has a groove arrangement (80), which comprises at least one groove recess (90), which is arranged on a mounting surface area (50, 70), wherein a groove recess (90) has a groove opening (95), which opens out to the respective mounting surface area (50, 70). In any case, the groove opening (95) is closed by in a fluid-tight manner means of the mounting surface area (50, 70) of at least one further housing part (40, 60). It is attained thereby that a fluid duct (99), through which fluid can flow and through which fluid can be applied to the sensor device (20), is limited between the respective groove recess (90) and the respective mounting surface area (50, 70).

20 Claims, 14 Drawing Sheets

(56) References Cited

U.S. PATENT DOCUMENTS

| | | | |
|---|---|---|---|
| 7,722,280 B2* | 5/2010 | Hofmann | B60G 7/001 |
| | | | 403/266 |
| 9,809,084 B2* | 11/2017 | Grieb | B60H 1/00528 |
| 2001/0043808 A1 | 11/2001 | Matsunaga et al. | |
| 2001/0054552 A1 | 12/2001 | Matsuo et al. | |
| 2011/0017742 A1* | 1/2011 | Sausen | B60H 1/00528 |
| | | | 220/324 |

* cited by examiner

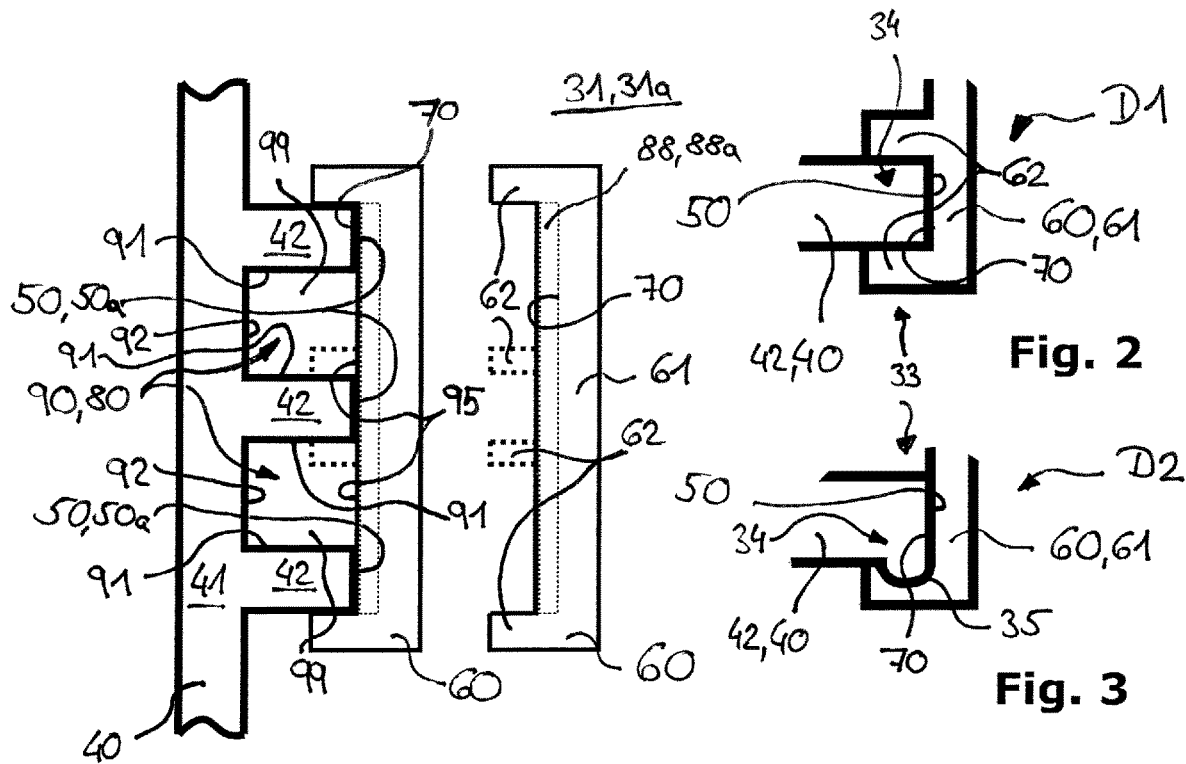
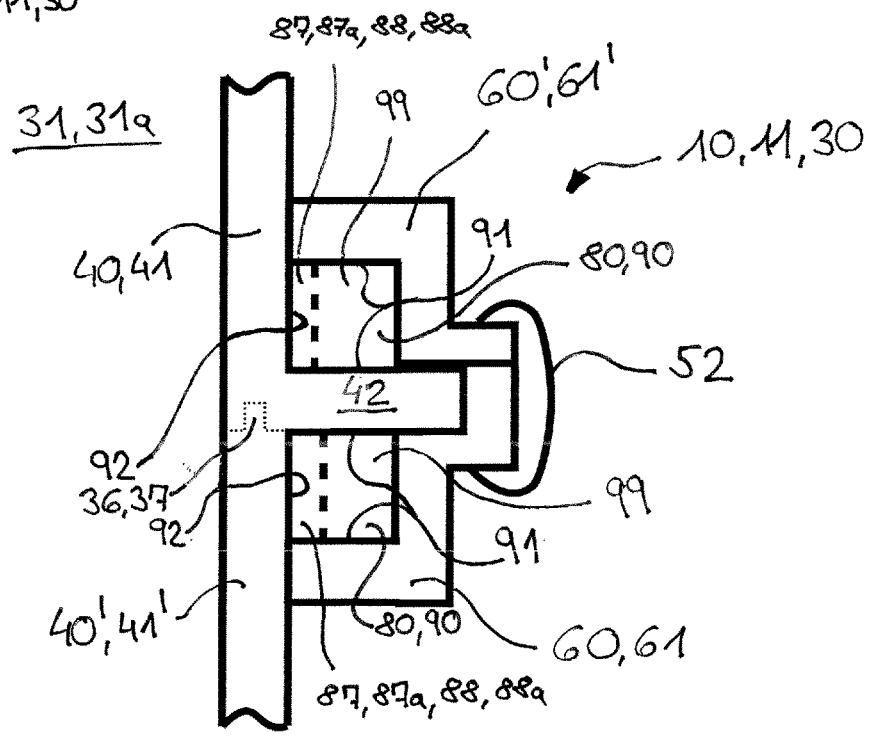
Fig. 1
Fig. 2
Fig. 3
Fig. 4

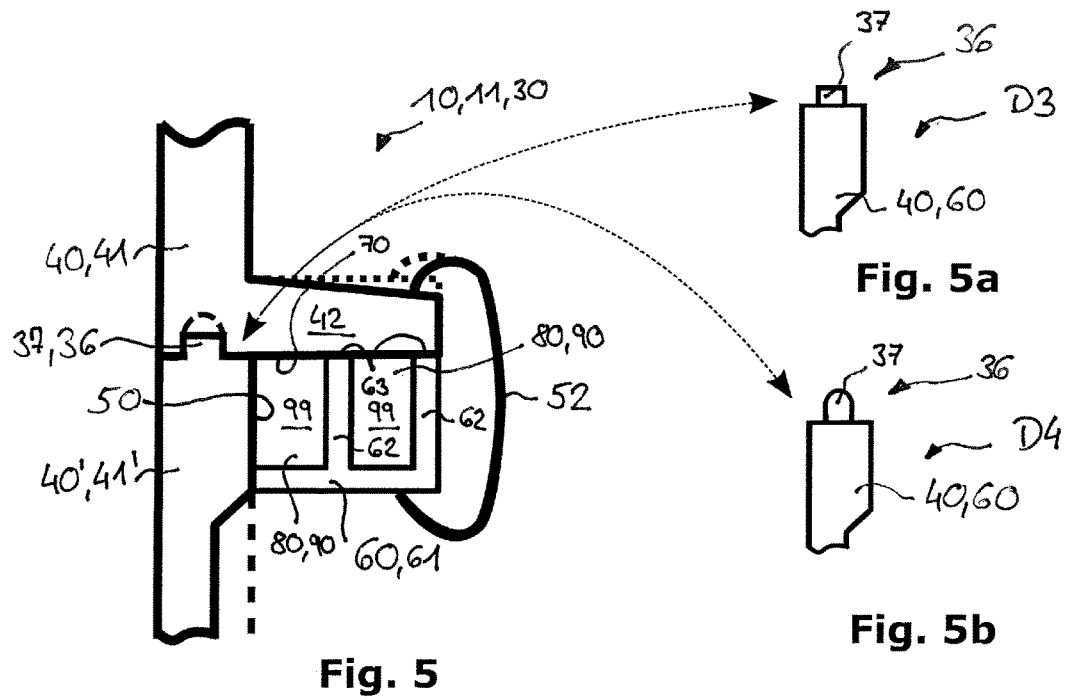
Fig. 5
Fig. 5a
Fig. 5b
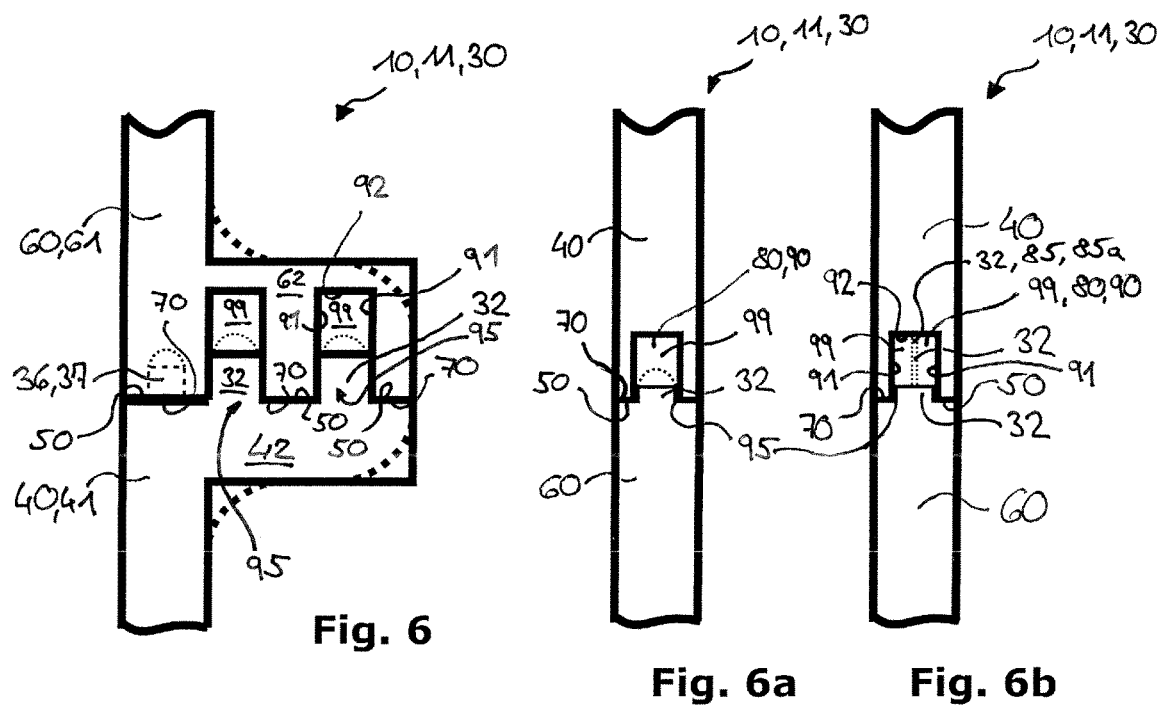
Fig. 6
Fig. 6a
Fig. 6b

FLUID LINE SYSTEM FOR GUIDING FLUID, IN PARTICULAR FOR A MOTOR VEHICLE, AND AIR CONDITIONING DEVICE FOR A MOTOR VEHICLE, IN PARTICULAR A HVAC DEVICE

CROSS-REFERENCE TO RELATED APPLICATION

This application claims priority to German Application No. DE 10 2019 205 938.4 filed on Apr. 25, 2019, the contents of which are hereby incorporated by reference in its entirety.

TECHNICAL FIELD

The invention relates to a fluid line system for guiding fluid. The invention further relates to an air conditioning device, in particular a HVAC device for a motor vehicle.

BACKGROUND

Fluid line systems are frequently used in the field of motor vehicle technology, in particular in so-called HVAC devices. With their help, fluid is guided there, for example to sensor devices, which can be arranged on the HVAC device as an example. The abbreviation "HVAC device" thereby identifies a "Heating-Ventilating and Air Conditioning Device", thus a device for conditioning ambient air, for example. In this context, the term "conditioning" means that the temperature, humidity, purity, and the composition of, for example ambient air, can be controlled or regulated by the HVAC device.

In any case, the sensor devices arranged on the HVAC device are provided for analyzing the fluid, which is guided towards them, and for providing sensor parameters relating to the analysis on the user side. The fluid can thus be evaluated, for example, with regard to its temperature, its composition or its purity. The fluid is usually air or ambient air, such as internal and/or external air, which originates either from an interior of the motor vehicle and/or from the atmosphere surrounding the motor vehicle.

To guide the internal air and/or external air towards and away from the sensor devices again, plastic hoses are typically used, which form a fluid line system. The plastic hoses thereby advantageously extend from a measuring tap, by means of which air is sucked in or blown out, through the motor vehicle up to a sensor supply section, by means of which fluid can be provided at the sensor device.

To firmly fix the plastic hoses, which quasi crisscross through the motor vehicle along a motor vehicle structure, to the motor vehicle structure, fastening means are necessary, by means of which the plastic hoses can be fastened to the motor vehicle structure. Clamps or other fastening means are typically used for this purpose. In response to the assembly, for example, they are arranged on the plastic hose on the one hand and are anchored on the motor vehicle structure on the other hand.

As a whole, the use of plastic hoses thus leads to a relatively large number of components and additionally to an unwanted additional effort in response to the assembly, even though it would be desirable to keep the assembly as well as the number of components simple or low, respectively.

SUMMARY

The object of the invention thus lies in providing an improved fluid line system for supplying sensor devices.

In the case of the present invention, this object is solved in particular by means of the subject matters of the independent claim(s). Advantageous embodiments are the subject matter of the dependent claims and of the description.

The basic idea of the invention lies in integrating the fluid guidance function, which has been realized by means of plastic hoses ever since, into a housing, in particular into the housing of a HVAC device. For this purpose, it is provided that a fluid line system for guiding fluid, in particular for a motor vehicle, initially has a sensor device for capturing sensor parameters, and a housing. Advantageously, the housing is made of several parts, it in particular has three, four or even more individual housing parts. In the assembled state, thus during operation, the housing parts form the housing, in particular a housing of the HVAC device. Each housing part thereby comprises a mounting surface area, which extends in particular along a longitudinal mounting axis and/or advantageously along a mounting contour. Advantageously, the mounting surface area is of elongated shape. The mounting surface area can, for example, comprise several individual mounting surface areas. A further or several housing parts are attached to the mounting surface area(s) of a housing part, advantageously in such a way that the mounting surface areas abut against one another with contact. The housing furthermore has a groove arrangement, which comprises at least one groove recess, which is arranged in particular on a mounting surface area. The groove recess is, for example, an elongated and slot-like recess. The groove recess further has a groove opening, which opens out to a mounting surface area. The groove recess can thereby extend along a longitudinal groove axis, which is oriented, for example, along the mounting contour. In the assembled state of the housing, the groove openings of the groove recesses are closed, in particular in a fluid-tight manner, by means of the mounting surface areas of at least one further housing part, wherein a certain leakage is possible. In terms of the invention, "tight" means that small leakages may be possible, and "fluid-tight" means that no leakages are possible.

Sealing means, such as, for example, sealing cords, can advantageously be arranged around the groove openings or around the groove arrangement, in order to reduce leakage. The required accuracy of the sensor can advantageously also be fulfilled with leakages. It is attained thereby that at least one fluid duct, through which a fluid can flow, is formed between the respective groove recesses and the respective mounting surface area. By means of the fluid duct, fluid can for example be guided to the sensor device, so that fluid can be applied to the latter through the fluid duct. Fluid can thus flow towards the sensor device or away from there.

It is generally conceivable that the fluid line system is not only used in combination with the housing of a HVAC device, but is also used in the case of housings of other components of a motor vehicle.

Preferably, the fluid is air or, as mentioned, internal air or external air or a combination of internal and external air.

Two or more groove recesses are advantageously arranged on a single housing part. The groove openings of the groove recesses thereby each open out at a single mounting surface area of the respective housing part. It is also conceivable, however, that the groove openings open out at different mounting surface areas of a housing part or mounting surface area segments of a housing part, for example when the mounting surface area of the respective housing part is segmented. In any case, the groove openings are closed, in particular in a fluid-tight manner, by means of a mounting surface area or several mounting surface areas of at least one further housing part. It is attained thereby that two or more fluid ducts, through which fluid can flow in each case, are formed. This has the advantage, for example, that only one housing part has to be provided with the groove recesses, which makes in particular the production of the fluid system relatively cost-efficient. This further has the advantage that a larger fluid volume can flow through the fluid line system, because the free flow cross section is enlarged. Different fluids, for example fluids, which originate from different measuring taps, can further flow through the separate fluid ducts.

The groove arrangement can advantageously comprise two or more groove recesses, wherein one or several groove recesses are arranged on at least two or more or all mounting surface areas of at least two or more housing parts. Two housing parts can, for example, each have one mounting surface area, each comprising a single or several groove recess. The groove openings of these groove recesses in each case also open out at a mounting surface area of the respective housing part. In the assembled state, the groove openings are advantageously arranged in such a way that they are closed, in particular in a fluid-tight manner, by mounting surface areas of at least one further housing part. It is attained thereby that at least one single or several groove recesses, which, during operation of the fluid line system, can each separately form a fluid duct, through which fluid can flow, are arranged on each housing part. This has the advantage, for example, that a larger fluid volume can flow through the fluid line system. Different fluids, for example fluids originating from different measuring taps, can further flow through the fluid ducts.

At least two housing parts advantageously each have a single or several groove recesses, which are arranged on a mounting surface area of the respective housing part, wherein the respective groove recesses are located opposite one another in pairs in such a way during operation of the fluid line system that they quasi form a single common fluid duct. The groove recesses of the two housing parts are thereby arranged in pairs on the respective mounting surface areas in such a way that one groove openings of a groove recess of a housing part and one groove openings of a further groove recess of a further housing part are in each case located opposite one another, so as to jointly form a fluid duct, through which fluid can flow. This has the effect, for example, that a clear flow cross section of the fluid duct is relatively large, so that a relatively large fluid volume can flow through the fluid duct.

It is advantageous in the case of the used sensor device, when the fluid to be analyzed, in particular the measuring and test air, is initially tapped at a measuring tap and is subsequently guided to the sensor device for its analysis, in particular via at least one of the formed fluid ducts. After the analysis, the fluid is guided back and is in particular blown out, for example via the measuring tap, at which the fluid had been tapped beforehand.

It can in particular be provided that the fluid ducts are each combined in pairs and open out at the sensor device in a measuring section arranged on the housing and in a sensor supply section for providing fluid. This has the advantage that the fluid can be tapped by the pressure level. This further has the advantage that an improvement of the accuracy of the sensor device can be attained.

The fluid ducts can in particular be integrated between or in the groove-spring region of a groove-spring arrangement, which connects two housing parts of the housing.

Hollow spaces, rib structures or cover parts inside the HVAC device, for example also groove-spring connections, are advantageously used to form a fluid line system, in particular the fluid ducts.

The fluid ducts of the fluid line system can optionally be injection molded to the housing or injected into the housing of a HVAC device, wherein the fluid ducts are advantageously made of the housing material or are extrusion coated as insert.

It can in particular be advantageous when two fluid ducts are formed in a common molding region, so that supply air and exhaust air can flow to the same pressure potential.

At least two fluid connections for connecting a fluid supply device and/or two fluid supply points for sucking in and blowing out fluid from a motor vehicle interior or an atmosphere surrounding the motor vehicle can advantageously be arranged on the measuring section. At least one fluid duct is thereby advantageously in each connected in a fluidically communicating manner to a single fluid connection, so that fluid can thus flow, for example, from the atmosphere surrounding the motor vehicle via the respective fluid connection to a fluid duct. The advantage is to be seen in that a fluid duct can be operated independently of other fluid ducts, because each fluid duct has a separate fluid connection. It can thus also be attained, for example, that different fluids can be guided in the fluid ducts. As an example, the fluid line system provides for a direct line guidance into the measuring section.

Advantageously, it is conceivable that one or several fluid connecting ducts and/or fluid supply ducts are provided at the sensor device between the actual fluid ducts and the measuring sections and/or sensor supply sections for providing fluid. The fluid connecting ducts can thereby connect a fluid duct to a measuring section in a communicating manner. The fluid supply ducts can further connect a fluid duct to the sensor supply sections in a communicating manner. In any case, an in particular fluidic connection is realized in both cases, so that fluid can flow from the fluid duct to the measuring sections or the sensor supply sections. The fluid connecting duct and/or the fluid connecting duct advantageously permeate the housing or a housing part, respectively, of the housing, in particularly completely.

At least a single fluid supply point is preferably formed as a nozzle-shaped measuring tapping body, by means of which supply air or exhaust air or a combination of supply air and exhaust air can be sucked out of or into a motor vehicle interior, respectively, or out of or into an atmosphere, respectively, which surrounds the motor vehicle. As cylindrical hollow body, the measuring tapping body is in particular arranged against the housing, in particular the HVAC housing, on the outside or on the inside in such a way that fluid can flow through its open flow cross section, for example into a fluid connecting duct and from there in a fluid duct.

It is advantageous when a duct separating body, which extends in particular longitudinally along the groove recess and which divides the groove recess into two or more fluid ducts, which are separated from one another, in particular separated in a fluid-tight manner, is arranged inside at least one groove recess. During operation of the fluid line system, it is thereby advantageously provided that the groove opening of the groove recess, which receives the duct separating body, is closed by means of a mounting surface area of at least one further housing part, so that two or more fluid ducts, through which fluid can flow, are limited between the groove recess and the respective mounting surface area and the duct separating body. This has the advantageous effect that the fluid ducts, which are formed by the duct separating body, can be operated independently of one another during operation of the fluid line system. For example, supply air can be guided through the one fluid duct, and exhaust air through the other fluid duct. This further has the production-related advantage that two fluid ducts can be realized by means of only a single groove recess, so that the production of a further groove recess can quasi be saved.

The duct separating body is preferably an elongated flat body made of plastic material, which can be inserted into one or several groove recess(es). The duct separating body is thereby in particular an elastic extrusion part, which is deformed in response to insertion into the groove recess, so that two fluid ducts are created.

If the housing parts of the housing are embodied in "hard-soft 2K" or "n-K", the fluid ducts and/or the groove recesses can be molded antistatically.

In the alternative or in addition, it can be provided that in response to the plastic injection molding of the HVAC housing, material or a material portion is used, which makes the plastic of the HVAC housing antistatic and/or conductive. Larger portions than the actual fluid line system can thereby also become antistatic and/or conductive (e.g. a filter-blower section).

Advantageously, the duct separating body is an elastic tubular soft body, which has an, in particular completely closed, circular cross section. During operation of the fluid line system, it can abut against groove flanks and a groove base of a groove recess and a mounting surface area all around in a fluid-tight manner, like a seal, so that it divides a fluid duct into at least two fluid ducts, so that fluid can quasi flow through the tubular soft body.

The tubular soft body can advantageously further have a circular cross section, which is open on one side, can in particular define a c-like cross section. It could also be said that the tubular soft body has a longitudinal slot. For example a cable or a cable bundle or the like can be arranged in any case in the interior of the tubular soft body prior to the assembly of the tubular soft body, in that the cable or the cable bundle is inserted through the slot.

In the assembled state and during operation of the fluid line system, the tubular soft body is advantageously arranged and for example squeezed in a groove recess in such a way that the c-shaped cross section, thus the c-shaped slot, which is open on one side, is closed completely and in a fluid-tight manner. During operation of the fluid line system, fluid can thus flow through the tubular soft body, in particular through the clear inner cross section of the tubular soft body.

The duct separating body can further be made of an antistatic material, which has inert properties with regard to the fluid. More preferably, it can be provided that the duct separating body is smooth on its surface or in particular has a roughness value of 0.006 or less than 0.006.

The duct separating body can in particular define a longitudinal body axis, with respect to which it has a completely continuous H-shaped or E-shaped or C-shaped cross section. The free cross sections of the duct separating body can thereby serve as fluid duct.

It is preferred, when a support body, which, for example, seals the fluid duct and/or, for example, fixes the duct separating body inside the groove recess, is inserted or can be inserted into a groove recess. In addition or in the alternative, the support body can advantageously serve to support a sealing function of a sealing body, which is inserted into the fluid duct, and/or to support a duct separating body. The support body is made, for example, of plastic material. The support body can extend longitudinally through the groove recess, for example as a flat body comprising a rectangular cross section. The support body can also have a quasi-oval cross section.

A support body, which is inserted into a groove recess, can advantageously be pretensioned, in particular in a spring-elastic manner, against a duct separating body, which is inserted into the same groove recess. This has the advantage that the duct separating body is pressed and fixed against the respective groove recess, in particular against the groove flanks and the groove base. For example the division of the groove recess into two separate fluid ducts, through which fluid can flow, is supported thereby.

A sealing body, for example a sealing mat, a sealing cord or a sealing tape can in particular be arranged between the mounting surface areas of the housing parts. In any case, the sealing body can abut against the mounting surface areas in a sealing manner during operation of the fluid line system, so that leakage is minimized and the groove recesses or the fluid ducts, respectively, are sealed, in particular in a fluid-tight manner. The sealing body can further be formed as insert and can be inserted into at least one groove recess. The sealing body can further be molded to or injection molded to the mounting surface areas, respectively, as a molded part quasi by means of a substance-to-substance bond, for instance like a surface coating.

A single filter body, which is oriented transversely to the fluid flow and which filters the fluid, which flows through the respective fluid duct, is advantageously arranged in one or several fluid ducts. It is also conceivable that several, for example two or three, filter bodies are each inserted into a single fluid duct, in order to virtually form a common filtration point. A measuring section can thereby in each case be arranged downstream with respect to the filtration point and upstream with respect to the filtration point. In particular a filtration performance and/or a pressure gradient can be determined and evaluated by means of a sensor device, which is fluidically connected to the measuring sections. The pressure gradient provides insight, for example, into the filtration performance, thus for example whether the filter body is clogged.

It is possible that a single or several positioning protrusions, which extend along the mounting surface area, are arranged on at least one housing part. The positioning protrusions serve for mutually aligning the housing parts relative to one another. Starting at a mounting surface area of a housing part, at least one positioning protrusion advantageously protrudes through a groove opening of a groove recess of an opposite housing part, whereby quasi a groove-spring arrangement is formed. A fluid duct is thereby formed at least between a groove recess and a positioning protrusion. As an example, the formation of the fluid duct is promoted in that a positioning protrusion abuts all around against the groove recess, in particular against both groove flanks of the groove recess, and that a distance is formed between a groove base and the positioning protrusion. The positioning protrusion is thereby quasi supported on the groove flanks, whereby the alignment of the housing parts relative to one another is attained. Starting at a mounting surface area, a positioning protrusion can alternatively extend through a groove opening up to a groove base, and can abut there with elastic contact, while the positioning protrusion maintains a lateral distance to the groove flanks. This has the advantage that the groove recess is separated into two separate fluid-tight fluid ducts by the positioning protrusion.

It can in particular be provided that a locking arrangement, which could also be referred to as clamping arrangement, by means of which the housing parts can be clamped to one another, is arranged on two or more housing parts. One or several locking seats can thereby be arranged on a first housing part, and one or several corresponding locking lugs can be arranged on a second housing part. In the assembled state of the fluid line system, the locking lugs engage with the locking seats, so that the housing parts are clamped.

A sensor device for capturing and providing sensor parameters is advantageously provided, which is arranged in particular on the housing or the HVAC housing or one or several housing parts. The sensor device can, for example, also be arranged in a hollow space inside the HVAC housing, in order to realize a simple arrangement of the sensor device and a simple connection to the fluid line system. The sensor device can, for example, also be inserted into a housing wall of the HVAC device, quasi integrated therein, in particular partially or completely. The sensor can also protrude to the inside, into the HVAC housing device, in order to provide for a relatively simple air extraction.

The sensor device is supplied with fluid in particular via the fluid ducts, wherein the fluid is guided, for example, through fluid ducts, which are combined in pairs. As an example, the fluid is provided, in particular sucked in, by an atmosphere surrounding the fluid line system, for example from the surrounding area, or from a further atmosphere surrounding the fluid system, in particular a motor vehicle interior.

The sensor device advantageously has a sensor housing, which is in particular arranged, for example screwed or adhered, to the housing or the HVAC housing or one or several housing parts on the outside or from inside. It is also conceivable that the sensor housing is arranged inside the housing part, in particular completely inside a housing or is formed by the housing or the housing part.

In any case, a housing part, a housing or a housing part of the HVAC device can have a front wall aperture. Because it is already present, the front wall aperture can be used for the sensor device, for example to guide fluid through the front wall aperture or to arrange the sensor device in the interior of the HVAC device.

The sensor housing can advantageously be arranged in or on a separate additional housing part, which is also referred to as intermediate housing. The intermediate housing in particular serves to receive one or several sensor devices, and to connect them to another housing part, a housing or a housing part of the HVAC device. The intermediate housing can further have to mounting surface areas, which are oriented opposite to one another and on which at least two housing parts, in particular housing parts of the HVAC device, are arranged by forming at least one, two or more fluid ducts. The intermediate housing is thereby arranged between the housing parts in a virtually sandwich-like manner.

The sensor device is advantageously arranged on the outside, inside or within the housing, a housing part or a housing part of the HVAC device in such a way that in particular no or only relatively short fluid ducts are required for guiding fluid to the sensor device.

The sensor device advantageously comprises an individual sensor or several individual sensors, which is then referred to as double sensor. As an example, an individual sensor is provided for the purpose of analyzing guided fluid. It is possible by means of two individual sensors, thus one double sensor, to analyze several, in particular two fluids.

The several fluids conveniently originate from different measuring points or measuring taps, respectively, the fluids originate, for example, from a motor vehicle interior and an atmosphere surrounding the motor vehicle. The analysis of the fluids can take place simultaneously thereby, thus at the same time. For example internal air from a motor vehicle interior as well as external air from the surrounding area can thus be analyzed, so that for example a monitoring of the internal or external air with regard to different quality parameters is possible simultaneously.

It is important to mention in this context that the sensor device or the individual sensor or the double sensors are each air quality sensors for measuring the air quality, according to a specified or specifiable air quality standard, it is for example a fine dust sensor.

Advantageously, an air conditioning device for a motor vehicle, in particular for a HVAC is provided, which has a fluid line system according to the above description.

Advantageously, elements for air tapping and recirculations can partially penetrate a housing wall of the housing parts.

The fluid line system is advantageously produced as part of a manufacturing method, in the case of which in particular the following steps are provided:

1) Providing a first housing part comprising a first mounting surface area, 2) providing a duct separating body, and 3) providing a second housing part, which has a mounting surface area and a groove recess arranged thereon, 4) inserting the duct separating body into the groove recess, 5) attaching the first housing part to the second housing part in such a way that the housing parts abut against one another with contact by means of the contact surfaces, 6) connecting or fixing the first housing part to the second housing part or vice versa.

The housing of the fluid line system advantageously comprises a groove arrangement, which comprises at least one double groove recess, which is arranged on a mounting surface area of the two housing parts. The double groove recess in particular has two individual groove recesses, which are arranged adjacent to one another. The double groove recess further has two groove openings, which open out towards the respective mounting surface area and which is closed by the mounting surface area of at least one further housing part. A double fluid duct, through which a fluid can flow, is thus formed between the respective double groove recess and the respective mounting surface area, which could also be referred to as "double groove spring".

The fluid line system is advantageously arranged or provided on at least one nozzle-shaped mounting protrusion or is formed by the latter. The mounting protrusion comprises two or more mounting protrusion parts, which are each arranged on a housing part of the housing, in particular the HVAC housing, and protrudes beyond the housing, in particular beyond the HVAC housing. The mounting protrusion parts are advantageously formed by means of a substance-to-substance bond or in a non-positive manner or integrally with the respective housing part of the housing. In the assembled state of the fluid line system, the mounting protrusion parts are arranged congruently on one another and abut against one another with contact and without gaps, whereby the mounting protrusion is quasi defined. Each mounting protrusion part advantageously has a mounting surface area, which serves to arrange a further mounting protrusion part. One or all mounting protrusions parts have a groove arrangement, which comprises at least one groove recess or double groove recess arranged on one of the mounting surface areas of the mounting protrusion parts. The groove recess or the double groove recess furthermore comprises a groove opening or double groove opening, which opens out to the respective mounting surface area of a mounting protrusion part, wherein the groove opening or the double groove opening can be closed or is closed by means of the mounting surface area of another mounting protrusion part, in order to limit a fluid duct or double fluid duct, through which fluid can flow and through which fluid can be applied to a sensor device or a sensor, between the respective groove recess or double groove recess and the respective mounting surface area. It could also be said that the fluid duct or the double fluid duct or the "double groove spring" are not formed directly as extension of the HVAC housing surface areas, but are arranged at a certain angle thereto.

At least one sensor or at least one sensor device can in particular be arranged on the mounting protrusion and can be connected in a communicating manner to the fluid duct or double fluid duct of the mounting protrusion, which provides the advantage that fluid can flow between the fluid line system and the sensor or the sensor device. The arrangement of the sensor or of the sensor device, respectively, on the mounting protrusion can take place, for example, by means of a bayonet closure or the like, so that the arrangement of the sensor or of the sensor device, respectively, on the housing or on the HVAC housing is relatively simple.

In summary, it should be noted: The present invention elates to a fluid line system for guiding fluid, in particular for a motor vehicle. The fluid line system comprises a sensor device for capturing sensor parameters, and a housing, which comprises two or more housing parts. Each housing part has a mounting surface area for arranging a further housing part. The housing further has a groove arrangement, which comprises at least one groove recess, which is arranged on a mounting surface area, wherein a groove recess has a groove opening, which opens out to the respective mounting surface area. In any case, the groove opening is closed in a fluid-tight manner by means of the mounting surface area of at least one further housing part. It is attained thereby that a fluid duct, through which fluid can flow and through which fluid can be applied to the sensor device, is limited between the respective groove recess and the respective mounting surface area.

In terms of the description, "abutting against one another with contact" means that no unnecessary distance or gap is present between two surfaces.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically,

FIG. 1 shows a view of a first exemplary embodiment of a fluid line system,

FIG. 2 shows an embodiment alternative D1 for the first exemplary embodiment,

FIG. 3 shows a further embodiment alternative D2 for the first exemplary embodiment, FIG. 4 shows a view of a second exemplary embodiment of a fluid line system, FIG. 5 shows a view of a further exemplary embodiment of a fluid line system, FIG. 5a shows a detail D3 of the fluid line system according to FIG. 5, FIG. 5b shows a detail D4 of the fluid line system according to FIG. 5, FIG. 6 shows a view of a further exemplary embodiment of a fluid line system, FIG. 6a shows a view of a further exemplary embodiment of a fluid line system, FIG. 6b shows the fluid line system according to FIG. 6a in a different embodiment alternative.

DETAILED DESCRIPTION

Figures 7, 8:
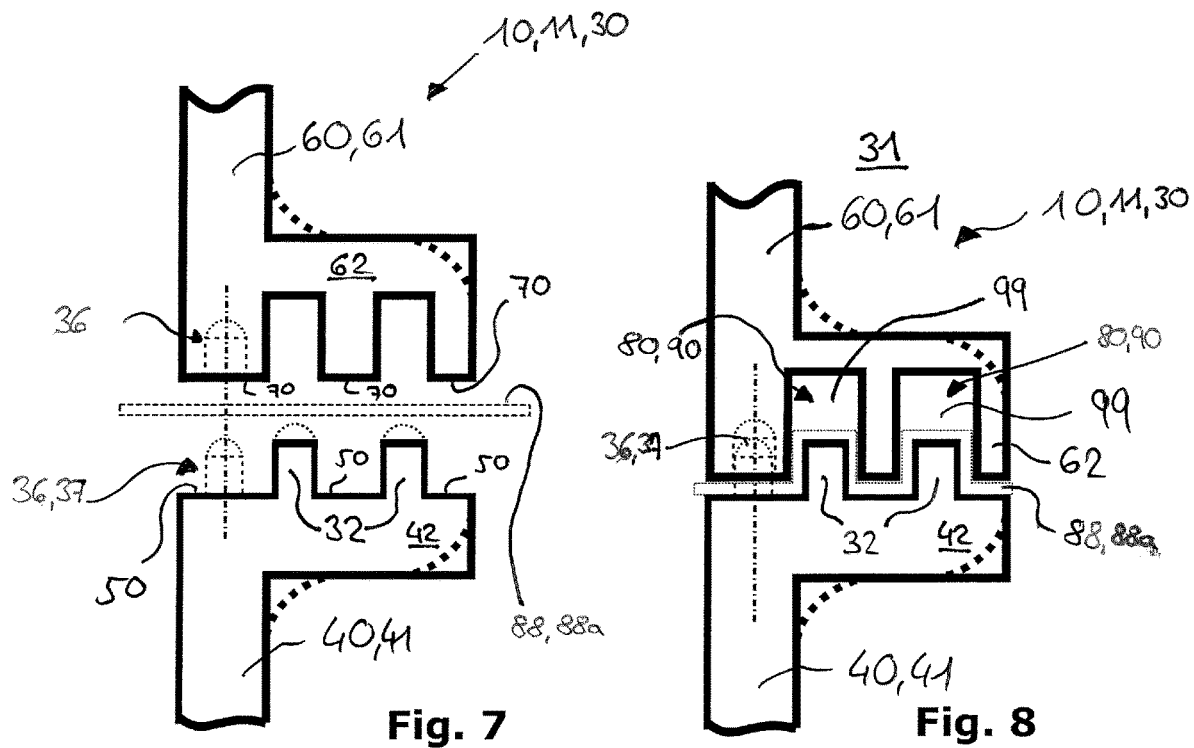
FIG. 7 shows a view of a fluid line system according to FIG. 6, but in a non-assembled state.
FIG. 8 shows a view of the fluid line system according to FIG. 6 in an assembled state.

The drawing as a whole shows various exemplary embodiments of a fluid line system, which is identified as a whole with 10, for guiding fluid, for example air. Fluid line systems 10 of this type are used, for example, in motor vehicles in the field of HVAC devices 11. There, fluid is guided to sensor devices 20 by means of the fluid line system 10, in order to analyze it.

According to FIG. 1, the fluid line system 10 comprises a housing 30, which, as example, forms a HVAC device 11, which is also suggested, for example, in FIGS. 27, 28, 29, and 30. The housing 30 comprises two or more housing parts 40, 60, which, in turn, each have a mounting surface area 50, 70 for arranging a different housing part 40, 60. During operation of the fluid line system 10, thus quasi in the assembled state, the two housing parts 40, 60 are placed on top of one another with contact in such a way that their mounting surface areas 50, 70 abut against one another with contact without gaps.

According to FIG. 1, the mentioned first housing part 40 has, as an example, a housing base body 41, which is made of a plastic material or a metallic material. The housing parts 40, 60 and/or the housing base body 41 are, for example, molded elements, injection molded elements or extrusion elements, which are produced as part of an extrusion molding process. As an example, the housing base body 41 has at least three housing protrusions 42, which each protrude away from the housing base body 41, in particular orthogonally. The housing protrusions 42 each comprise a face 50a facing away from the housing base body 41, which are also referred to as mounting surface area segments 50a. As a whole, the front faces 50a or the mounting surface area segments 50a form a mounting surface area 50. For the assembly of the fluid line system 10, an adhesive, for example, can be applied to one or both mounting surface areas 50, 70 and/or the mounting surface area segments 50a, in order to permanently connect the two housing parts 40, 60 to one another. It is conceivable that additional sealing means are applied to one or both mounting surface areas 50, 70, in order to improve the leak-tightness during operation of the fluid line system 10, and to minimize a leakage, for example by means of a sealing cord or a sealing film.

The fluid line system 10 according to FIG. 1 further has a groove arrangement 80, which comprises groove recesses 90 arranged between the housing protrusions 42. Each groove recess 90 thereby advantageously has a groove opening 95, which opens out to the respective mounting surface area 50, 70 of a housing part 40, 60. As an example, the groove recesses 90 according to FIG. 1 are slot-like groove recesses 90, which preferably extend along the respective housing part 40, 60, in particular along a longitudinal groove axis 12, 12' suggested in FIG. 29. Each groove recess 90 can virtually have a groove base 92 and in particular two opposite groove flanks 91, which is suggested, for example, in FIGS. 1 and 4.

As an example, the mentioned second housing part 60 is designed like a cover and, according to FIG. 1, is illustrated in two different positions, namely in a position, which represents the assembled state, and in a position, which represents an open state, which differs from the assembled state. The second housing part 60 has a housing base body 61, which, like the other housing base body 41, can have housing protrusions 62, which protrude away from the housing base body 61, in particularly orthogonally. The second housing part 60 furthermore has a mounting surface area 70, against which the mounting surface area 50 and/or the mounting surface area segments 50a and/or the front faces 50a of the housing part 40 abut, in particular with contact, in the assembled state of the fluid line system 10.

When the two housing parts 40, 60 are placed on top of one another and abut against one another with contact in the assembled state of the fluid line system 10 according to FIG. 1, no unnecessary distance is present between the mounting surface areas 50, 70, so that one can also say that they abut against one another without gaps. In particular, the groove openings 95 of the groove recesses 90 are thereby closed, in particular in a fluid-tight manner, so that at least one fluid duct 99, through which fluid can flow, is limited between the housing parts 40, 60. According to FIG. 1, even two fluid ducts 99 are limited, through which fluid can flow. Fluid can be applied, for example, to a sensor device 20 through the fluid duct 99, which can be seen, for example, in FIGS. 22 and 23.

To support the closing and/or sealing of the groove openings 95, it can be provided according to FIG. 1 that a sealing body, which is identified with reference numeral 88, is provided. As an example, the sealing body 88 can be inserted into one or both housing parts 40, 60, for example as insert 88a. In FIG. 1, the insert 88a or the sealing body 88, respectively, is illustrated by means of a dashed line and is arranged on the one housing part 60 on the mounting surface area 70 thereof. In the assembled state of the fluid line system 10, the sealing body 88 is attached to the mounting surface areas 50 or the mounting surface area segments 50a, respectively, in order to seal the fluid ducts 99 against an atmosphere 31 or a further atmosphere 31a, in particular in a fluid-tight manner.

Embodiment alternatives D1, D2 of the fluid line system 10 according to FIG. 1, which each show different designs of a locking arrangement 33, are illustrated in FIGS. 2 and 3. Locking arrangements 33 can generally be used in the case of a fluid line system 10 according to FIG. 1, in order to fasten the hosing parts 40, 60 to one another in a releasable or non-releasable manner. For this purpose, the locking arrangement 33 advantageously has locking seats 34 and corresponding locking lugs 35, as can be seen, for example, in FIGS. 2, 3, 19, and 20.

It can be seen according to FIG. 2 that two housing protrusions 62, which limit a locking seat 34 between one another, are arranged on a housing base body 61 of a housing part 60. A housing protrusion 42 of a housing part 40 is inserted into the locking seat 34, so that said housing part is enclosed from both sides. For example adhesive can be applied into the locking seat 34, in order to permanently adhere the housing protrusion 42 quasi to the housing part 60.

According to FIG. 3, a further locking arrangement 33 is provided, which likewise has locking seats 34 and corresponding locking lugs 35. As an example, the locking seats 34 are arranged on the housing part 60, in particular on housing protrusions 62, and are each designed in the manner of a recess in the housing part base body 61 or in the housing protrusions 62. Locking lugs 35 can engage with the locking seats 34 or the recesses, respectively, in particular in a positive manner, in order to fix the two housing parts 40, 60 to one another. It goes without saying that the locking lugs 35 and the locking seats 34 can be arranged, for example, the wrong way round, so that for example the locking seats 34 are arranged on the housing protrusions 42 of the housing part 60.

A further exemplary embodiment of the fluid line system 10 is illustrated in FIG. 4, wherein a housing, which is described with reference numeral 30, can be seen, which consists of a multi-part housing part 40, 40' having base bodies 41, 41', and of an, in particular multi-part, housing part 60, 60' having a housing base body 61, 61'. On a free end of a housing base body 41, 41', the multi-part housing part 40, 40' has a housing protrusions, which is identified with reference numeral 42, which protrudes orthogonally away from the housing base bodies 41, 41' like a mandrel. The housing part 60, 60' can be arranged on the housing protrusion 42 and the housing base bodies 41, 41' like a cover. The housing base bodies 61, 61' advantageously form a suitable receptacle for the housing protrusion 42, so that the housing base bodies 61, 61' can be fastened, for example in that the housing protrusion 42 is inserted into the receptacle. For fastening, it is provided to use a clamp, which is identified with reference numeral 52. As an example, the clamp 52 can thereby be arranged on the housing base bodies 61, 61' in such a way that it clamps the housing base bodies 61, 61' to the housing protrusion 42, in order to ensure a clamping.

At least the housing parts 40, 40', 60, 60' according to FIG. 4 are designed in such a way that, in cooperation, they limit at least one or several groove arrangements 80 or groove recesses 90, respectively, which form fluid ducts 99. Fluid can flow through the fluid ducts 99, for example a separate fluid in each fluid duct 99. One or, as a whole, a single sealing body 88 can advantageously be arranged in each case inside the fluid ducts 99, in particular as an insert 88a, in order to seal the fluid ducts 99 against the environment in a fluid-tight manner. More advantageously, one or, as a whole, a single support body 87, can be arranged in each case inside the fluid ducts 99, in particular as a flat body 87a, in order to support non-illustrated structures, which are arranged inside the fluid ducts 99.

The housing parts 40, 40' are further positioned and/or fixed to one another by means of a positioning device 36, which has a positioning pin 37 or a positioning strip 37. In FIG. 4, the positioning strip 36 is suggested by means of a dotted line.

A further exemplary embodiment of the fluid line system 10 is illustrated in a simplified view in FIG. 5, wherein, as in the case of the preceding exemplary embodiment, it is also provided here to connect a multi-part housing part 40, 40' to a housing part 60, which acts as cover. In contrast to FIG. 4, the housing part 60, however, is formed in one piece and is arranged quasi between the housing protrusion 42 and housing base bodies 41, 41' of the housing parts 40, 40'. The housing part 60 is for example releasably fixed to the housing protrusion 42 by means of a clamp 52. Here, the clamp 52 also acts quasi like a collet. It can also be provided that the housing parts 40, 40' are aligned relative to one another and/or are fixed to one another by means of a positioning device, which is identified with reference numeral 36. A positioning pin 37 or a positioning strip 37, respectively, of the positioning device 36 can advantageously have a head, which is suggested by a dashed line in FIG. 5 and which is designed to be round or rounded.

The housing part 60 is at least designed in such a way that, as in FIG. 1, it comprises at least one or two or more housing protrusions 62, on the front faces of which mounting surface areas 63 are arranged. In the assembled state of the fluid line system 10, which can be seen according to FIG. 5, the housing parts 40, 40', 60 are arranged on one another in such a way that the mounting surface areas 63 and a housing base body 61 of the housing part 60 abut against mounting surface areas 50, 70 of the housing parts 40, 40', 60 with contact, in particular in a fluid-tight manner, in order to limit at least one or two or more groove arrangements 80 or groove recesses 90, respectively, between the housing parts 40, 40', 60, which, in turn form fluid ducts 99. It can further be provided that the housing protrusion 42 or the housing parts 40, 40', 60 are designed, for example, so as to be rounded on one of their edges or so as to be tapered towards a free end, which is illustrated as an example by means of dotted lines in FIG. 5.

A detail D3 or D4, respectively, is illustrated in FIGS. 5a and 5b, which are various embodiments of the positioning device 36. According to the detail D3 shown in FIG. 5a, it is a positioning pin 37 or a positioning strip 37 comprising a front side, which is designed to be flat or planar, wherein the positioning pin 37 or the positioning strip 37 preferably has a rectangular cross section, based on its main direction of expansion. A positioning strip 37 extends, for example, along a longitudinal groove axis 12, 12', which is suggested in FIG. 29.

According to the detail D4 illustrated in FIG. 5b, it is provided that the positioning pin 37 or the positioning strip 37 has a round head or a rounding, respectively.

It can be seen in FIG. 6 that two housing parts 40, 60 are arranged on one another, whereby they contact one another on mounting surface areas 50, 70. It is provided that two or four or six or more fluid ducts 99 are formed between the housing parts 40, 60 by means of two or four or six or more adjacent groove recesses 90, wherein the groove recesses 90 are arranged on a single or several housing base bodies 41, 61 or the housing parts 40, 60. As an example, groove openings 95 of the groove recesses 90 are arranged on a mounting surface area 50, 70 of the two housing parts 40, 60 or on several mounting surface areas 50 or 70 or several housing parts 40, 60 in such a way that they open out there. According to the assembled state of the fluid line system 10, which can be seen in FIG. 6, a fluid duct 99, through which fluid can flow, is limited between the respective groove recess 90 and the respective mounting surface area 50, 70.

On the housing parts 40, 60 according to FIG. 6, at least one positioning device 36 comprising a positioning pin 37 or a positioning strip 37, which are each suggested by means of dotted lines, is further provided on the housing parts 40, 60 according to FIG. 6. The positioning device 36 thereby has the purpose of positioning the two housing parts 40, 60 relative to one another and/or to fix the two housing parts 40, 60 to one another in a releasable or non-releasable manner.

According to FIG. 6, one or several positioning protrusions 32 can further be arranged on the one or the other housing part 40, 60. The positioning protrusions 32 thereby protrude from the respective housing part 40, 60 in a fork-like manner, so that at least one positioning protrusion 32 can be inserted into a groove recess 90, in particular through a groove opening 95. The respective positioning protrusion 32 thereby abuts against groove flanks 91 of the respective groove recess 90 with contact. The positioning protrusions 32 have the purpose of positioning the two housing parts 40, 60 relative to one another, and/or to fix the two housing parts 40, 60 to one another in a releasable or non-releasable manner. The positioning protrusions 32 thus fulfill the function of the positioning device 36, for example that a positioning device 36 can be forgone. The positioning protrusions 32 can advantageously further protrude into the respective groove recesses 90 to the extent that a fluid duct 99 is limited between a positioning protrusion 32 and a groove base 92 of the groove recess 90. It could also be said that a gap between a positioning protrusion 32 and a groove base 92 is formed, through which fluid can flow the front side of a positioning protrusion 32 can advantageously be designed to be flat or rounded. As an example, the positioning protrusions 32 are a spring-groove combination.

Figure 17:
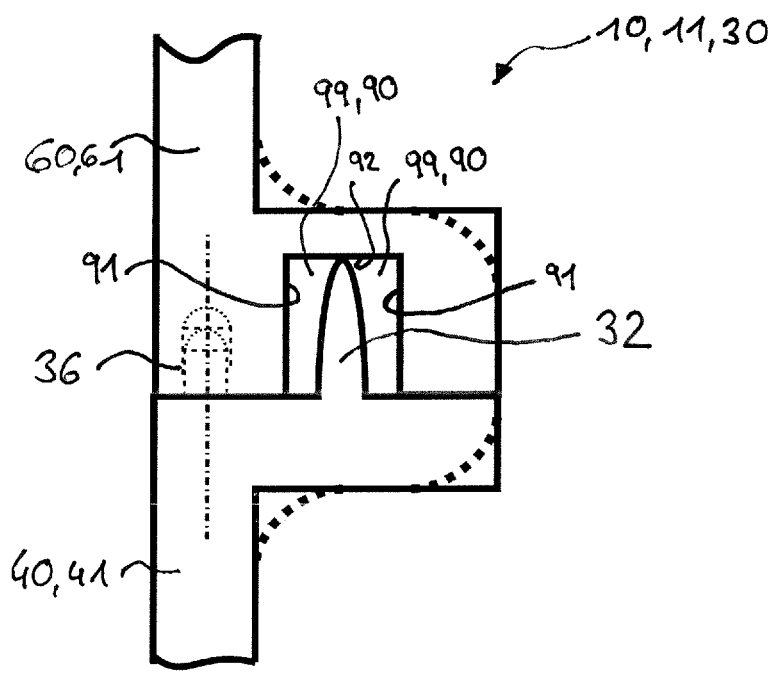
FIG. 17 shows the exemplary embodiment of the fluid line system according to FIG. 6 in a view in a further embodiment alternative.

It is possible and can be seen, for example, according to FIGS. 6*b* and 17 that a positioning protrusion 32, which is designed to be narrow and does not abut against the groove flanks 91, protrudes through the groove recess 90 up to a groove base 92 and abuts against the latter with contact, in order to divide the groove recess 90 into two ducts 99, which are separated from one another in a fluid-tight manner. The respective positioning protrusion 32 can thus divide the groove recess 90 into two separate fluid ducts 99, which are separated from one another, in particular in a fluid-tight manner, during operation of the fluid line system 10, so that quasi two fluid flows, which are independent of one another, can be guided through a groove recess 90.

According to FIG. 6*a*, a fluid line system 10 comprising two housing parts 40, 60 can be seen, wherein, as an example, a groove recess 90 of a groove arrangement 80, which opens out on a mounting surface area 50, is arranged on the housing part 40. A groove opening 95 of the groove recess 90 is further sealed by a mounting surface area 70, so that, as a whole, a single fluid duct 99, through which fluid can flow, is limited. A positioning protrusion 32, which is arranged on a housing part 60, advantageously protrudes into the groove recess 90, so that an additional positioning device 36 can be forgone. The positioning protrusion 32 can thereby have a rounded or flat front side.

The exemplary embodiment according to FIG. 6*b* differs from the exemplary embodiment according to FIG. 6*a* only in that the positioning protrusion 32 according to FIG. 6*b* is arranged on a groove base 92 of the groove recess 90 with contact and at lateral distance to groove flanks 91. The groove recess 90 is thus quasi divided into two, namely into two fluid ducts 99, which are separated from one another. In the alternative, a duct separating body 85 can be used instead of the positioning protrusion 32. The duct separating body 85 is preferably made of a plastic material and is provided to divide the groove recess 90 into two or several fluid ducts 99, which are separated from one another, in particular in a fluid-tight manner, such as the positioning protrusion 32 described here. It is also attained thereby that two or more fluids, which are separated from one another, can flow through the fluid line system 10 during operation of the fluid line system 10. The duct separating body 85 is realized, for example, as tubular soft body 85*a*.

It can be provided that the duct separating body 85 is designed in the shape of a tubular soft body 85*a*. The tubular soft body 85*a* is, for example, of tubular shape and is inserted or placed into a groove recess 90, where it defines a longitudinal body axis 84, which is suggested, for example, according to FIG. 13. The tubular soft body 85*a* is preferably made of a plastic material and has a circular cross section, which is in particular closed completely. During operation of the fluid line system 10, the tubular soft body 85*a* abuts all around against groove flanks 91 and a groove base 92 of the groove recess 90*a* in a fluid-tight manner, so that the fluid duct 99, which now quasi runs through the clear cross section of the tubular soft body 85*a*, is sealed.

It is not illustrated in FIGS. 6*a*, 6*b*, but is conceivable that a sealing body 88 in the shape of an insert 88*a* or a support body 87 in the shape of a flat body 87*a* are provided instead of the duct separating body 85. As an example, the sealing body 88 is not an insertable insert 88, but a plastic bead, which was molded onto the positioning protrusion 32 prior to the assembly.

The support bodies 87 can additionally be inserted into the groove recesses 90, in order to support the duct separating body 85, in particular the tubular soft body 85*a*, or a sealing body 86, in particular an insert 88*a*. The support bodies 87 are, for example, of elongated flat body design and are realized, for example, as elastic sealing tape. In any case, the support body 87 is inserted along the groove recess 90 in such a way that it cooperates with contact with a duct separating body 85 or a sealing body 88, in order to attain a pre-tensioning of the duct separating body 85 or of the sealing body 88 against the groove base 92 and/or the groove flanks 91 or the groove recess 90.

The fluid line system 10 according to FIG. 6 is illustrated in FIG. 7, but in a non-assembled state. A sealing body 88 in the shape of an insert 88*a* is additionally further arranged between the mounting surface areas 50, 70 of the housing parts 40, 60. As an example, the insert 88*a* is an elongated flat body, for example a sealing tape.

The fluid line system 10 from FIG. 7 is shown in an assembled state in FIG. 8, whereby the sealing body 88 or the insert 88*a*, respectively, has clung to the mounting surfaces 50, 70, thus also to the housing protrusions 62, and also to the positioning protrusions 32. It is thus attained that the fluid ducts 99 formed between the housing part 40 and the housing part 60 are sealed, in particular in a fluid-tight manner, with respect to an atmosphere 31 surrounding the housing 30. It can be provided, for example, that, in the assembled state of the fluid line system 10, the insert 88*a* protrudes into a fluid duct 99, in order to influence, for example, the flow in the interior of the fluid line 99. This is suggested as an example in FIG. 16, where the insert 88*a* is illustrated in a dashed manner and protrudes into a respective groove recess 90.

Figure 9:
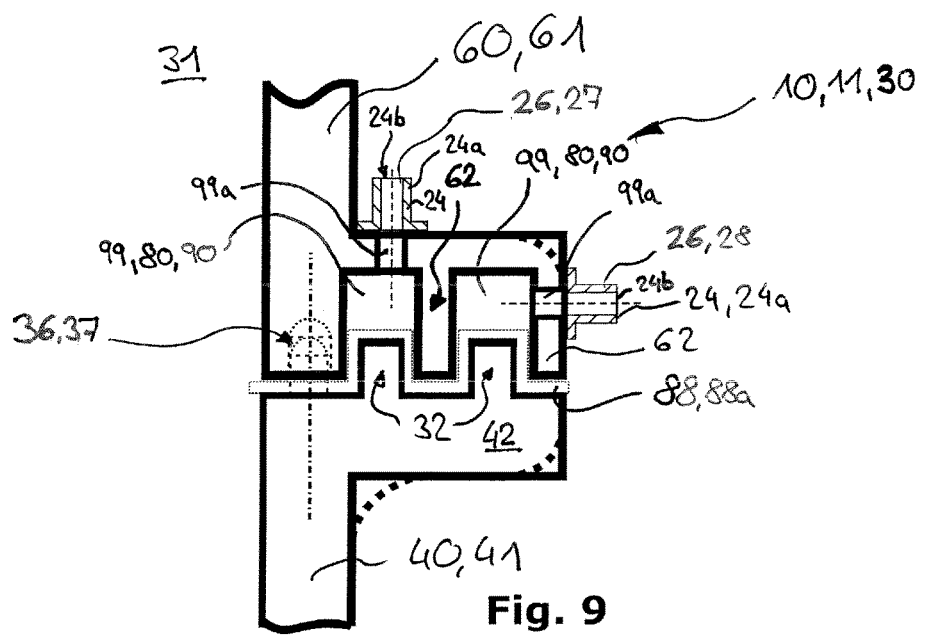
FIG. 9 shows a view of a fluid line system according to FIG. 6, but comprising measuring tapping bodies arranged on the housing.
Figure 10:
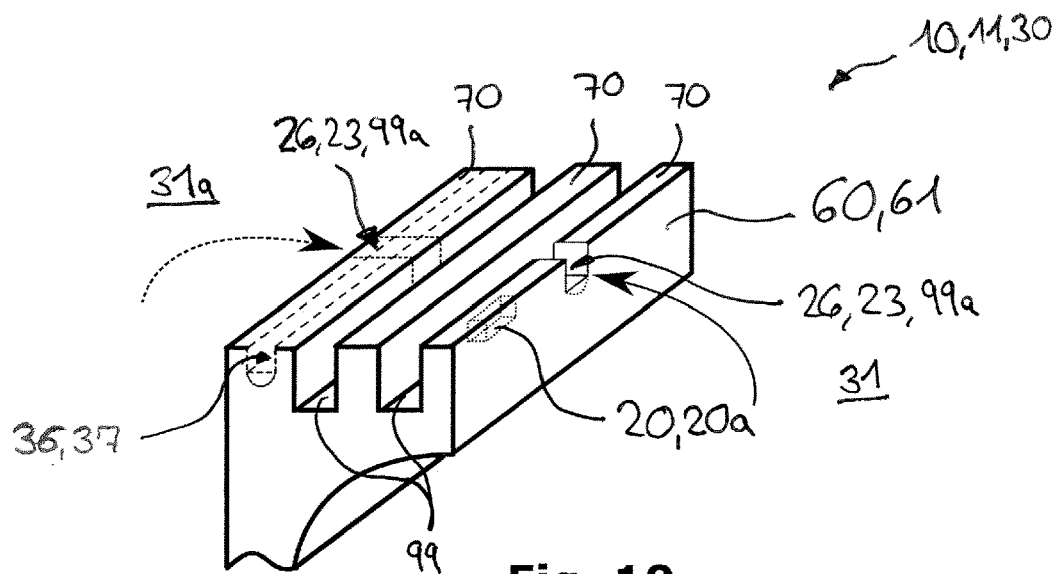
FIG. 10 shows a perspective view of a housing part of the fluid line system according to FIG. 6 in a first embodiment alternative.
Figure 11:
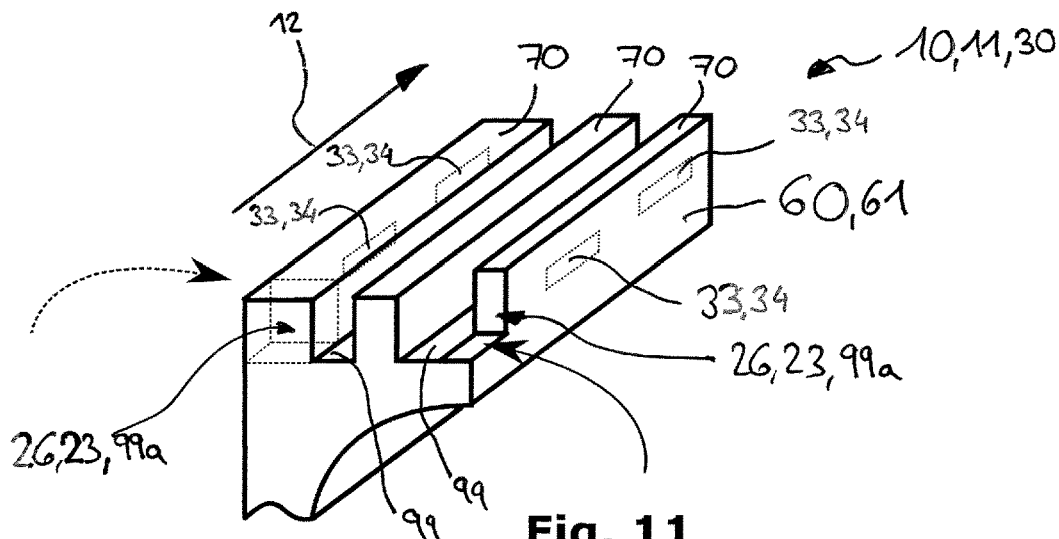
FIG. 11 shows a perspective view of a housing part of the fluid line system according to FIG. 6 in a second embodiment alternative.
Figure 12:
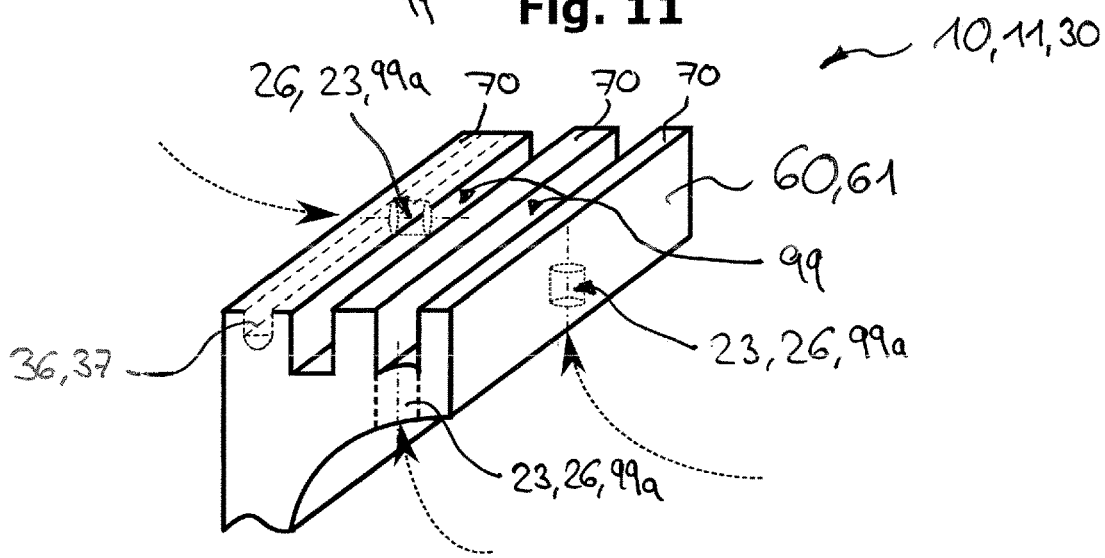
FIG. 12 shows a perspective view of a housing part of the fluid line system according to FIG. 6 in a further embodiment alternative.

According to FIG. 9, it can be seen that the fluid ducts 99 each open out in a measuring section 26, which is arranged on the housing 40, 60. Fluid from an atmosphere 31, for example, can be sucked in at a measuring section 26. It can further be provided that at least two fluid connections 27, 28 for connecting a non-illustrated fluid supply device or fluid supply points 23 for sucking in and blowing off fluid, are arranged on the measuring section 26. As an example, the fluid supply points 23 are illustrated in FIGS. 10 to 12 or in FIGS. 22, 23, 24, 25, 26, 27, 28, and 30, for example by means of a circle. In any case, each fluid connection 27, 28 can be fluidically connected to a single fluid duct 99, wherein a fluid connection duct 99*a* is advantageously provided, by means of which a fluidic connection between a fluid duct 99 on the one hand and a fluid connection 27, 28 on the other hand is realized through a housing part 40, 60.

The fluid supply points 23 or the fluid connections 27, 28 can be formed by a measuring tapping body 24, which, as an example, is illustrated as nozzle-shaped connecting body, see FIG. 9. The measuring tapping body 24 makes it possible to tap supply air or exhaust air or a combination of supply air and exhaust air from an atmosphere 31 surrounding the fluid line system 10. A measuring tapping body 24 can thereby be designed as cylindrical hollow body 24*a*, which is arranged, for example screwed or adhered, to the housing 30 or the housing parts 40, 60, respectively, on the outside or inside. The measuring tapping body 24 has an open flow cross section 24*b*, through which fluid can flow via a fluid connecting duct 99*a* towards the fluid duct 99.

According to FIGS. 10 to 12, a perspective view of a housing part 60 of the fluid line system 10 having a housing base body 61 can be seen, wherein the further housing part 40 is not arranged on the housing part 60. The fluid ducts 99 extending along the longitudinal groove axis 12, the positioning device 36 extending along the longitudinal groove axis 12, and the mounting surface area 70 can thus be seen relatively well. The fluid ducts 99 are practically each combined in pairs, so that two fluid ducts 99 run adjacent to one another, thus next to one another.

Different embodiments of the fluid supply points 23 of a measuring section 26 are illustrated in FIG. 10, which, as an example, are recesses in the housing part 60. For example, these recesses permeate the housing part 60 completely, so that fluid can flow or can be sucked into the one or other fluid duct 99, for example from the atmosphere 31 or a further atmosphere 31*a*. In the case of the embodiment alternative according to FIG. 10, a sensor 20 or a sensor device 20, respectively, is furthermore integrated into the housing part 60, a sensor housing 20*a* of the sensor device 20 is, for example, screwed or adhered to the housing part 60. In the alternative, the sensor housing 20*a* can also be inserted completely into a wall of the housing part 60, so that the sensor housing 20*a* does not protrude beyond the housing part 60 or the housing 30. The inflow of fluid is suggested by means of arrows in FIG. 10.

According to FIG. 11, it is provided that the recesses forming the fluid supply points 23 are arranged on a free component end of a housing part 60, quasi as edge disruption. It is further provided that one or several trough-like locking seats 34 of a locking arrangement 33 are arranged on an outer jacket surface area of the housing part 60. The locking seats 34 are suggested as an example by means of a dotted line.

According to FIG. 12, it is provided that the fluid supply points 23 are produced, for example, by means of one or several bores or the like, which simplifies the production of the fluid supply points 23. The bores are suggested in FIG. 12 by means of a dashed line.

Figure 13:
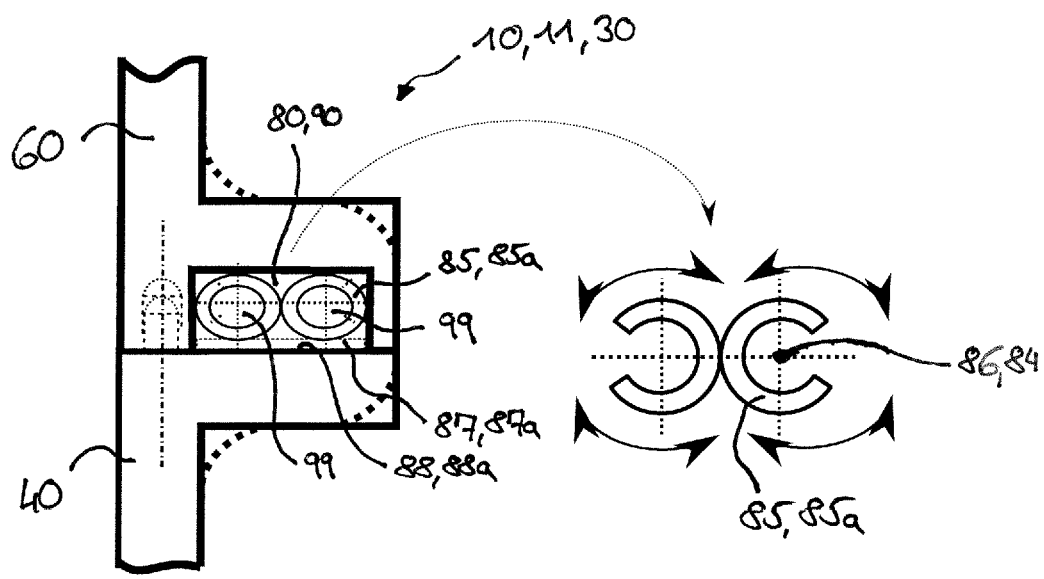
FIG. 13 shows the exemplary embodiment of the fluid line system according to FIG. 6 in a view in a further embodiment alternative.
Figure 14:
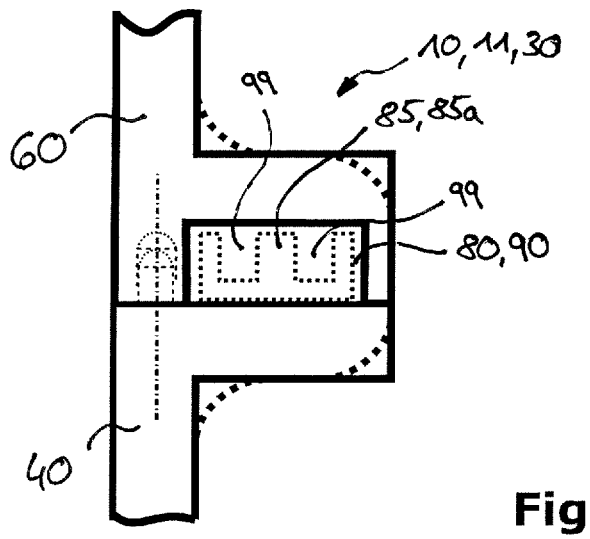
FIG. 14 shows the exemplary embodiment of the fluid line system according to FIG. 6 in a view in a further embodiment alternative.
Figure 15:
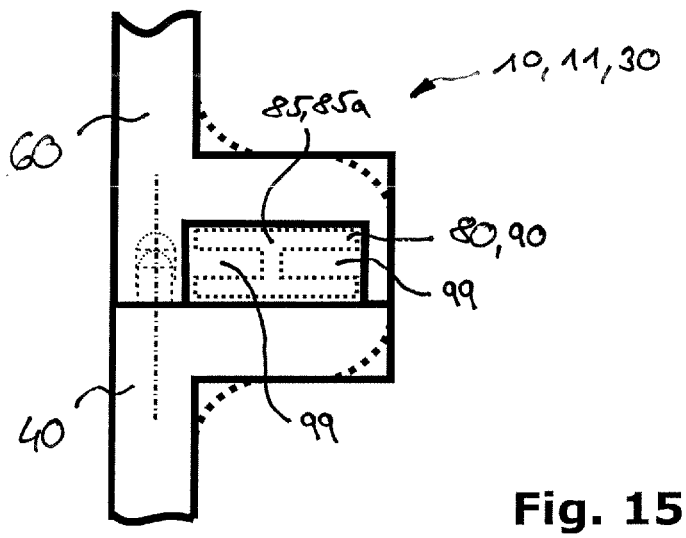
FIG. 15 shows the exemplary embodiment of the fluid line system according to FIG. 6 in a view in a further embodiment alternative.

The duct separating body 85, which has already been described above, can preferably be designed as tubular soft body 85*a*. Different design alternatives have turned out to be advantageous thereby. Three different shapes of the tubular soft body 85*a* are illustrated in FIGS. 13, 14, and 15. It goes without saying that further shapes are conceivable. A tubular soft body 85*a* can generally be arranged in a groove recess 90, for example to divide the groove recess 90 into two or more fluid ducts 99, which are separated from one another, so that two or more fluid flows, which are independent of one another, can in each case be guided through a groove recess 90. The tubular soft body 85*a* can thereby be arranged in a groove recess 90 in such a way that it abuts all around in a fluid-tight manner against groove flanks 91 and a groove base 92 of the groove recess 90 and a mounting surface area 50, 70, for example like a seal. The tubular soft body 85*a* thereby extends in a main direction of expansion, in particular along a longitudinal duct body axis 86, which runs, for example, parallel along the longitudinal groove axes 12, 12'. In any case, the tubular soft body 85*a* according to FIG. 13 has a cross section, which, in the disassembled state of the fluid line system 10, consists of two c-shaped cross sections, which are arranged on one another and which are open on one side. A cable or the like, for example, can be inserted through the open slot. The c-shaped slot, which is open on one side, is closed during operation of the fluid line system 10, so that the tubular soft body 85*a* then has a double O-shaped cross section. The O-shaped cross section can preferably also be shaped to be oval. According to FIG. 13, a support body 87, in particular a flat body 87*a*, can be in the groove recesses 90, for supporting the tubular soft body 85*a*, which is inserted into the fluid duct 90. A sealing body 88, in particular an insert 88*a*, can further also be provided instead of the support body 87. An H-shaped or an E-shaped cross section of the tubular soft body 85*a*, as it can be seen in FIGS. 14 and 15, is also preferred.

Figure 16:
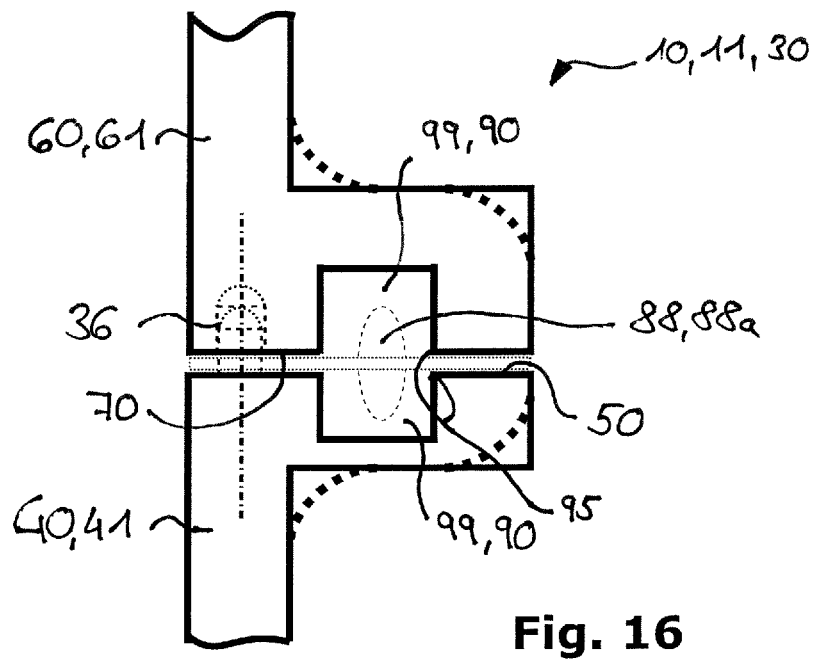
FIG. 16 shows the exemplary embodiment of the fluid line system according to FIG. 6 in a view in a further embodiment alternative.

According to FIG. 16, a fluid line system 10 can be seen, which comprises two housing parts 40, 60. The housing parts 40, 60 each have a housing base body 41, 61, whereby they are each arranged on top of one another with contact with one of their mounting surface areas 50, 70. The housing base bodies 41, 61 each have a single groove recess 90, wherein the respective groove opening 95 opens out on the respective mounting surface areas 50, 70. The groove recesses 90 of the two housing parts 40, 60 air located opposite one another in pairs, in order to form a common fluid duct 99, through which fluid can flow. An embodiment of this type has the advantage that a relatively large flow cross section of the fluid duct 99 can be realized, in order to be able to convey, for example, a large fluid volume through the fluid duct 99. A sealing body 88, in particular an insert 88*a*, is further illustrated in a dashed manner in FIG. 16. The sealing body 88 divides the fluid duct 99 into two smaller fluid ducts 99, wherein a protrusion of the sealing body 88 protrudes into the flow cross sections of the fluid ducts 99, in order to cooperate, for example, with the fluid flow. The embodiment according to FIG. 16 further has a positioning device 36.

A simplified view of a fluid line system 10 comprising two housing parts 40, 60 is illustrated in FIG. 17. As in FIG. 16, the housing parts 40, 60 each have a housing base body 41, 61, wherein, however, a groove recess 90 is arranged only in one housing base body 61. It can further be seen that, starting at a housing part 40, a positioning protrusion 32, which is arranged on a housing part 40, protrudes to a groove base 92 and abuts there with contact, so that the groove recess 90 is divided into two fluid ducts 99, which are separated from one another, in particular in a fluid-tight manner. The positioning protrusion 32 is thereby in each case arranged at a distance to the two groove flanks 91 of the groove recess 90.

Figure 18:
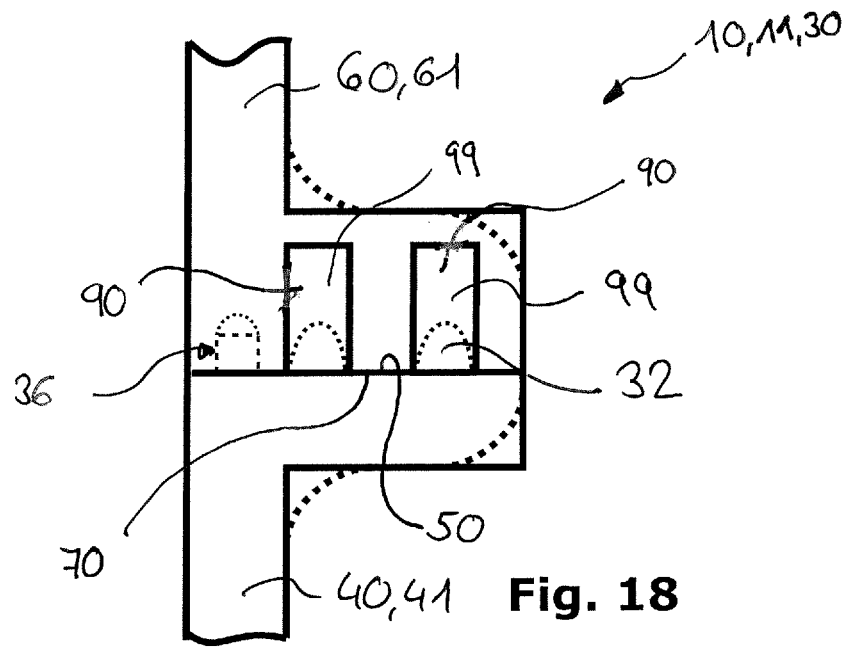
FIG. 18 shows the exemplary embodiment of the fluid line system according to FIG. 6 in a view in a further embodiment alternative.

As can be seen for example in FIG. 18, but also in FIG. 6b to 15, 17, 19, 20, 22, 27, 28 or 30, two or more groove recesses 90 can be arranged on a single housing part 40, 60, and can thereby each be combined in pairs. A support body 87, an insert 88 or a positioning protrusion 32, which is suggested as an example by means of a dashed line in FIG. 18, can thereby advantageously be arranged in one or in both groove recesses 90.

Figure 19:
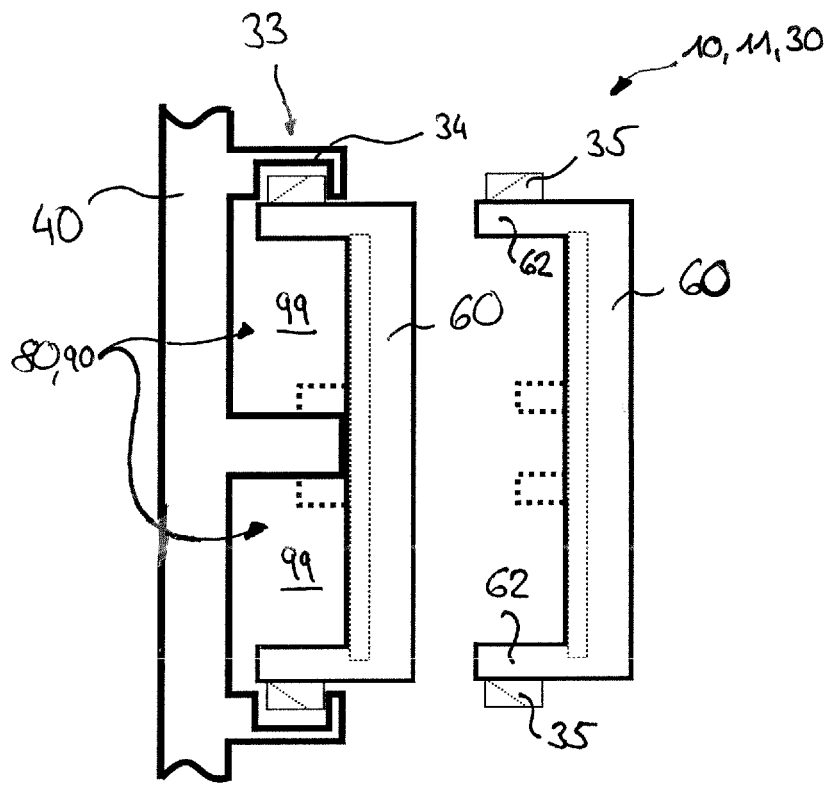
FIG. 19 shows a view of the first exemplary embodiment of a fluid line system according to FIG. 1 in a further embodiment alternative.

The exemplary embodiment according to FIG. 19 differs from the exemplary embodiment according to FIG. 1 in particular by a different design of the locking arrangement 33, as well as by a different design of the groove recesses 90. As illustrated in FIG. 1, two different positions of the housing part 60 are also illustrated as an example in FIG. 19, which is, for example, an assembled state and an open state, which differs therefrom. In any case, two locking lugs, which are each identified with reference numeral 35 and which are arranged on housing protrusions 62 of the housing part 60, are provided on the housing part 60. The locking lugs 35 protrude to the outside in an ear-like manner. The locking lugs 35 advantageously have a lead-in chamfer, which is suggested by means of a dashed line in FIG. 19. The locking arrangement 33 further has a locking seat 34, which is arranged on the hosing part 40 and which, in contrast to the exemplary embodiment according to FIG. 1, is open on the inside towards the groove recesses 90. In contrast to the exemplary embodiment according to FIG. 1, the groove recesses 90 forming the groove arrangement 88 are changed with regard to their cross section, in particular enlarged, so that, as a whole, a larger fluid volume can flow through them.

Figure 20:
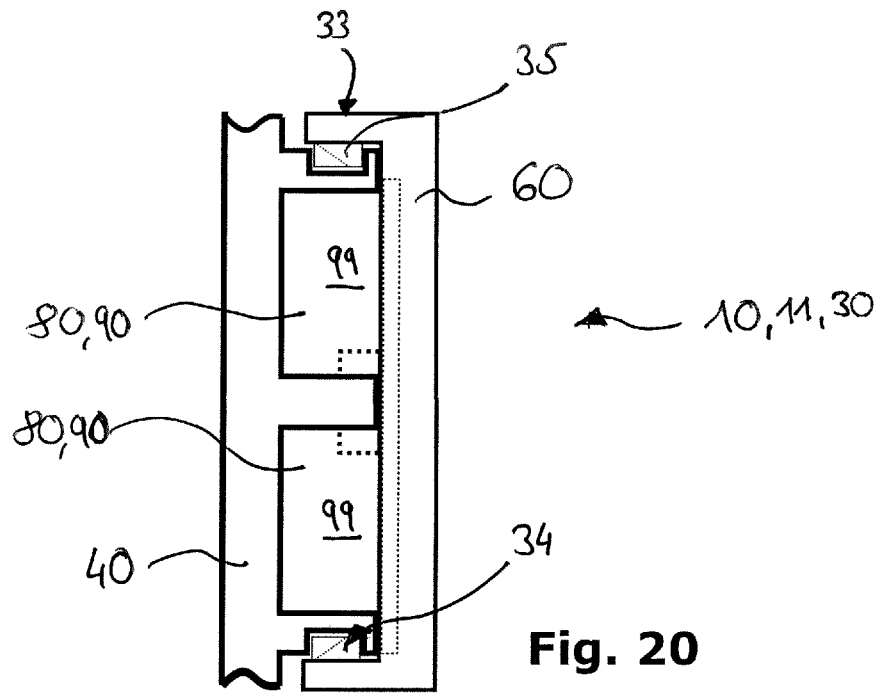
FIG. 20 shows a view of the first exemplary embodiment of a fluid line system according to FIG. 1 in a further embodiment alternative.

The exemplary embodiment according to FIG. 20 differs from the exemplary embodiment according to FIG. 1 by a different design of the locking arrangement 33, which, in turn has locking lugs, which are identified with reference numeral 35. The locking lugs 35 are arranged on housing protrusions 62 on the housing base body 61 of the housing part 60, and, in contrast to the exemplary embodiment according to FIG. 1, now protrude from there to the inside, towards the groove recesses 90. The locking lugs 35 quasi snap into locking seats, which are identified with reference numeral 34, of the housing base body 41 of the housing part 40, in order to fix the two housing parts 40, 60 to one another.

Figure 21:
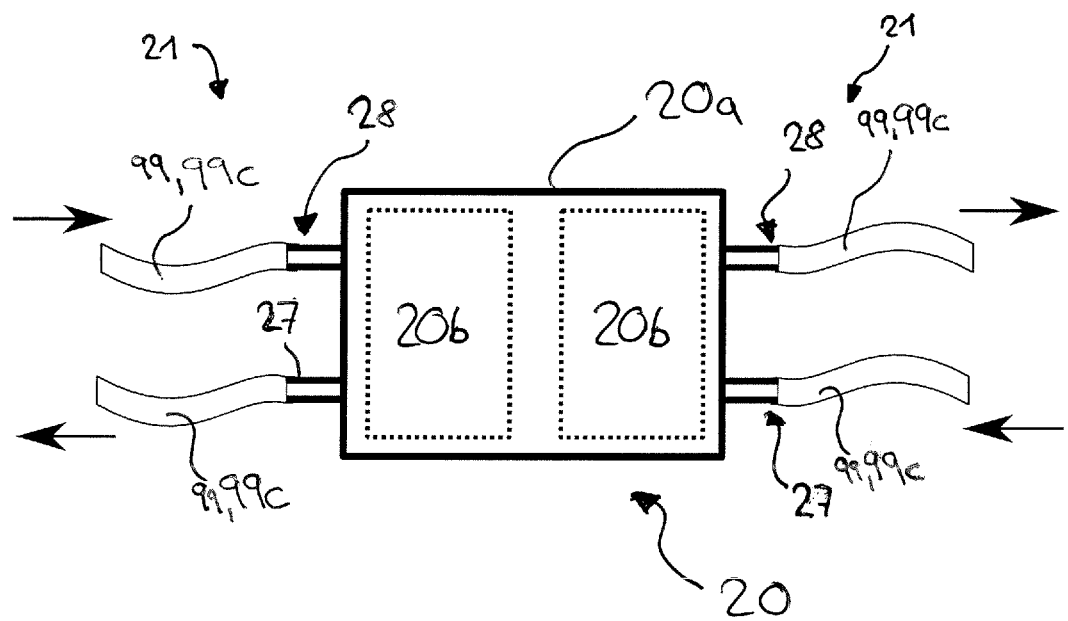
FIG. 21 shows a simplified view of a sensor device.

A simplified view of a sensor device 20 for capturing sensor parameters can be seen according to FIG. 21. The sensor device 20 serves the purpose of analyzing a fluid, which is guided to one or several sensor supply sections 21 of the sensor device 20 via a fluid duct 99 and/or a fluid supply duct 99c, and to provide sensor parameters. The sensor device 20 comprises the above-mentioned sensor housing, which is identified with reference numeral 20a, as well as at least one sensor supply section 21 for providing fluid on the sensor device 20. Each sensor supply section 21 comprises in particular two fluid connections 27, 28 for connecting fluid lines 99 or below-described fluid supply ducts 99c. It is possible that the sensor supply sections 21 open out directly at a fluid duct 99 or an atmosphere 31, 31a surrounding the fluid line system 10. It can further be seen in FIG. 21 that the sensor device 20 is a so-called double sensor. The latter advantageously has two individual sensors 20b, which work independently and which can each separately analyze a guided fluid and can provide sensor parameters. The fluid, which is provided on the double sensor or the sensor device 20, originates for example from an atmosphere 31 surrounding the fluid line system 10 or from a further atmosphere 31a, which is formed, for example, by a housing interior, for example the HVAC device 11.

In a practical manner, it is provided that a connection between a sensor device 20 or the sensor supply section 21 thereof, respectively, and the atmosphere 31, 31a or the fluid duct 99 is produced with the help of fluid supply ducts 99c, which are suggested in a dotted manner in the drawing. Fluid can thereby flow through a fluid supply duct 99c, for example from the fluid duct 99 to the sensor supply section 21 of the sensor device 20.

Figure 22:
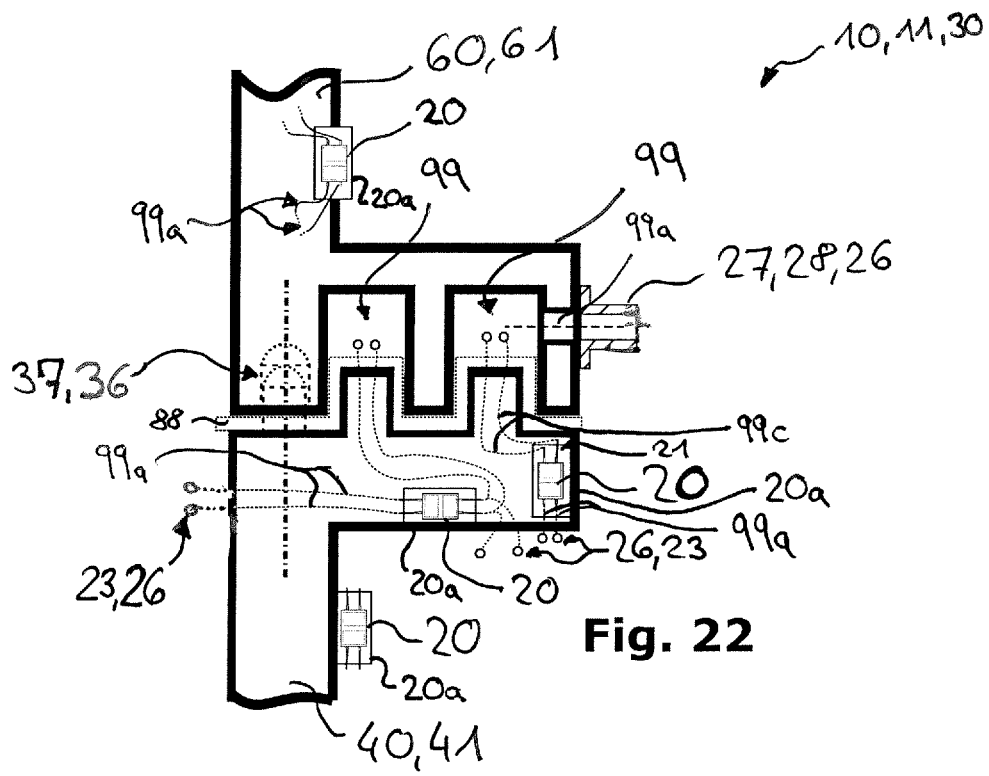
FIG. 22 shows the exemplary embodiment of the fluid line system according to FIG. 6 in a view in a further embodiment alternative comprising a sensor device.

By means of its sensor housing 20a, the sensor device 20 can be arranged in any case on a housing part 40, 60, which is illustrated in FIG. 22, or on the housing base bodies 41, 61, respectively. Different positions are conceivable thereby. The sensor device 20 can generally be arranged on a housing part 40, 60 by means of its sensor housing 20a. The sensor housing 20a can thereby be arranged on the housing parts 40, 60 on the outside in such a way that it protrudes beyond the housing parts 40, 60. The sensor housing 20a, however, can, for example, also be received, in particular completely, in the interior of a housing part 40, 60. The sensor housing 20a is then sunk completely in the respective housing part 40, 60. As an example, the sensor housing 20a can conclude in a planar manner, quasi in a flat manner, with a surface of the housing 30 or of the housing parts 40, 60. The sensor device 20 can further be arranged inside, in particular completely inside, or also only on a jacket surface of a housing part 40, 60.

Several fluid connecting ducts 99a and fluid supply ducts 99c are further provided in FIG. 22, wherein a fluidic connection between a fluid duct 99 on the one hand and a fluid connection 27, 28 on the other hand through a housing part 40, 60 is realized by means of the fluid connecting ducts 99a. As an example, the fluid connecting ducts 99a are designed as through recesses 99a or as through bores 99a. Fluid is guided from a fluid duct 99 to a sensor supply section 21 of the sensor device 20 by means of the fluid supply ducts 99c, so that fluid can be provided at the sensor device 20. The fluid supply duct 99c is suggested by means of a dashed line in the drawing, for example according to FIGS. 23 to 26. The fluid supply duct 99c extends, for example, through a housing base body 41, 61 of a housing part 40, 60, and opens out into a fluid duct 99 on the one hand and into a sensor supply section 21 on the other hand. The advantage that fluid can flow from the fluid duct 99 to the sensor device 20 is attained thereby.

Figure 23:
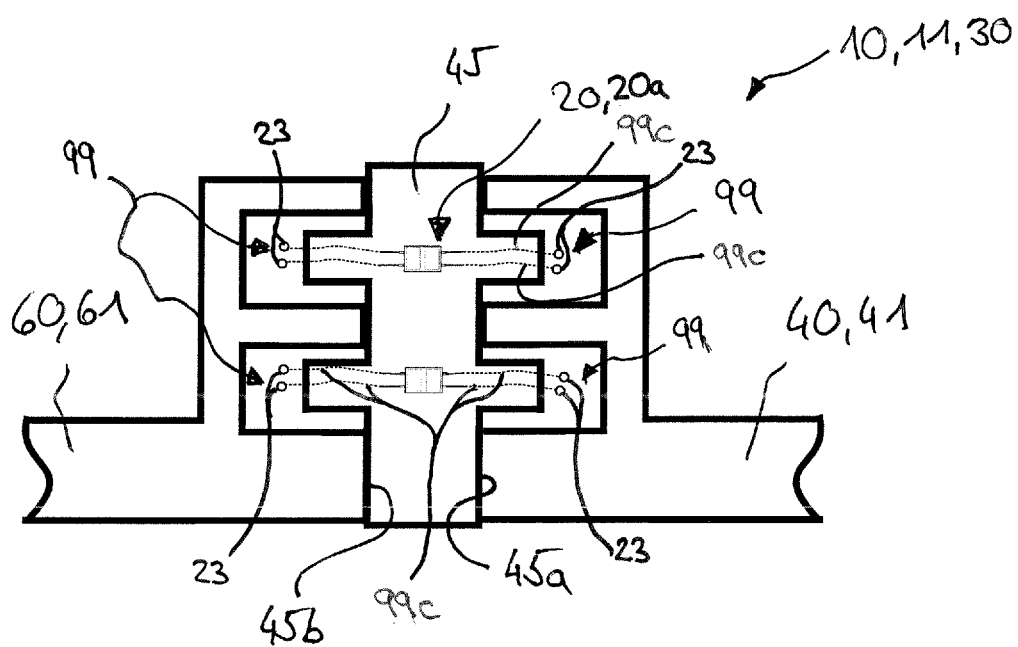
FIG. 23 shows a view of a further exemplary embodiment of a fluid line system, namely comprising an intermediate housing.
Figure 25:
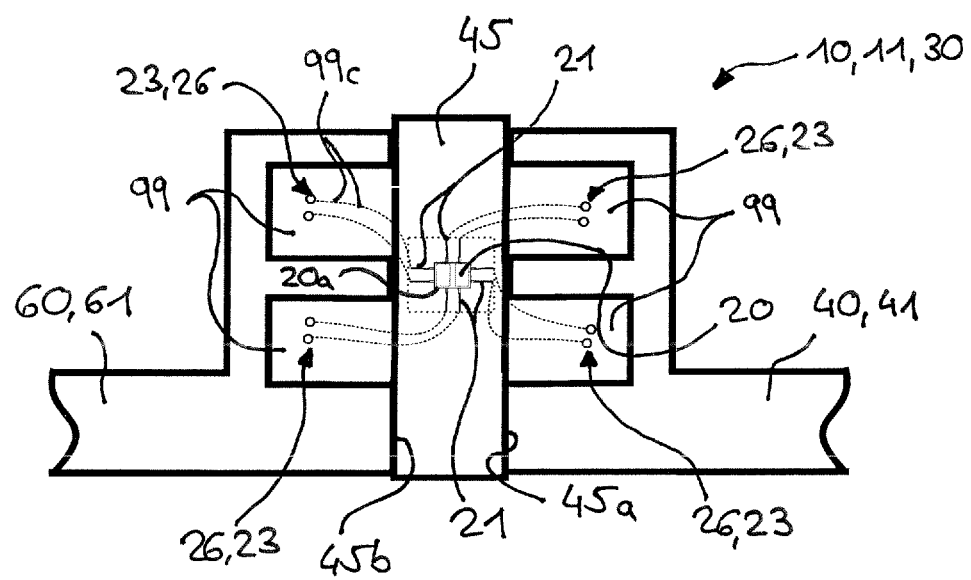
FIG. 25 shows a view of an exemplary embodiment of a fluid line system according to FIG. 23 in a different embodiment alternative.
Figure 26:
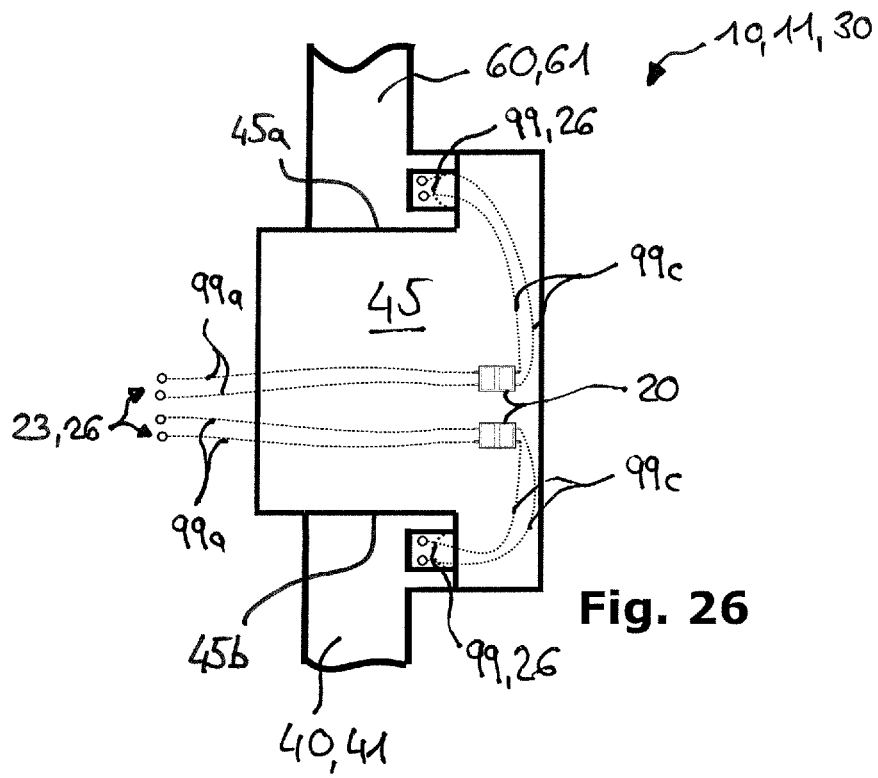
FIG. 26 shows a view of the first exemplary embodiment of a fluid line system according to FIG. 23 in a further embodiment alternative, namely comprising an intermediate housing.

Further fluid line systems 10, each in a relatively highly simplified view, are illustrated in FIGS. 23, 25, and 26. They differ from the remaining exemplary embodiments only by an additional intermediate housing 45. The sensor device 20 can be arranged on the intermediate housing 45, whereby for example the arrangement of the sensor device 20 on a housing part 40, 60 can be forgone. The intermediate housing 45 comprises at least two mounting surfaces 45a, 45b, which are oriented in particular opposite to one another. The housing parts 40, 60, for example, can quasi be attached to the mounting surfaces 45a, 45b by means of their mounting surface areas 50, 70 in such a way that a housing 30 as a whole can be produced. The housing parts 40, 60 and the intermediate housing 45 can advantageously be arranged on top of one another such that at least one or more, for example two, three or four fluid ducts 99 are formed between them. In any case, the intermediate housing 45 is stretched between the housing parts 40, 60 in a sandwich-like manner.

The intermediate housing 45 suggested in FIGS. 23, 25, and 26 can further completely receive the sensor device 20. It is advantageous thereby when a sensor housing 20a of the sensor device 20 is arranged inside, in particular completely inside, or also only on a jacket surface area of the intermediate housing 45.

Figure 24:
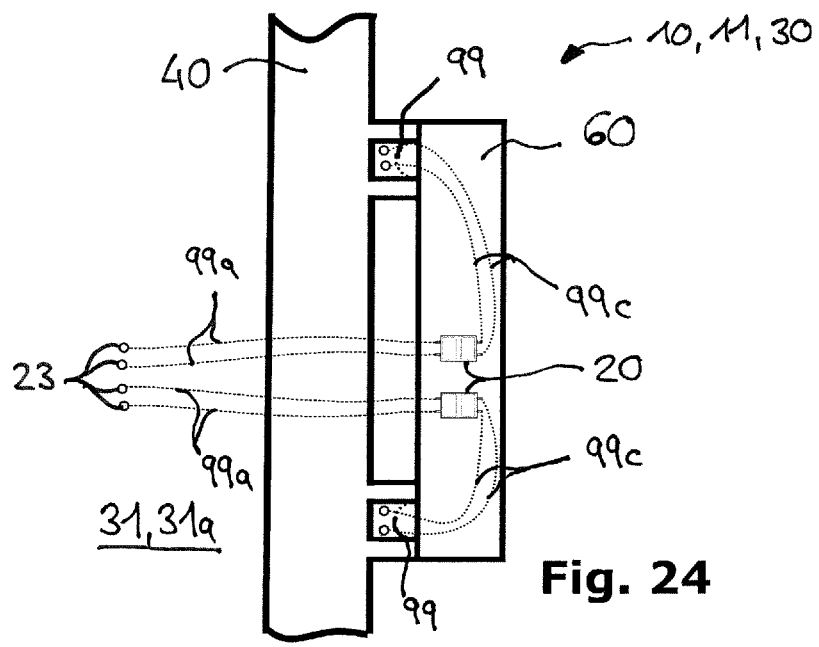
FIG. 24 shows a view of the first exemplary embodiment of a fluid line system according to FIG. 1 in a different embodiment alternative.

The exemplary embodiment illustrated in FIG. 24 differs from the first exemplary embodiment according to FIG. 1 in particular in that the housing part 60, which acts as cover, can receive the sensor device 20. The sensor device 20 is advantageously arranged in the interior of the housing part 60, in particular completely in the interior, so that the sensor device 20 does not protrude beyond the housing part 60. The sensor device 20 is in contact in a communicating manner with at least one filter duct 99 via fluid supply ducts 99c. The sensor device 20 is further in contact with the atmosphere 31, 31a via fluid connecting ducts 99a. As a whole, a simple supply of the sensor device 20 with fluid can thus be ensured.

Figure 27:
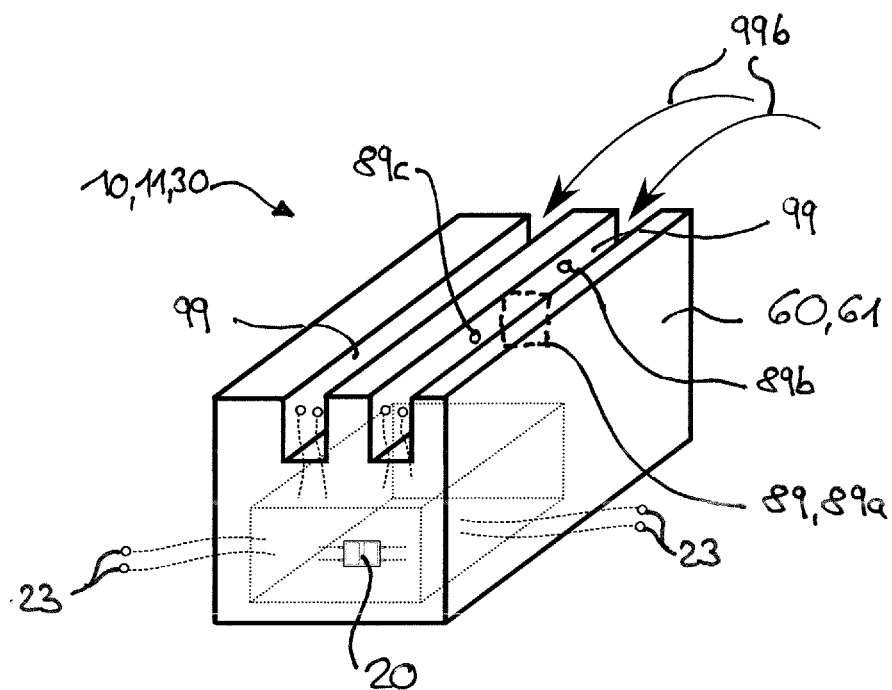
FIG. 27 shows a perspective view of a HVAC device housing part comprising a fluid line system and a sensor device.

According to FIG. 27, an individual housing part 60 comprising a housing base body 61 can be seen, wherein a further housing part 40 comprising a housing base body 41 is not illustrated in favor of the identifiability of fluid ducts 99 and a filtration point 89a. A filter body 89, which is oriented transversely to a fluid flow 99b, which is suggested by means of arrows, is arranged in one or both fluid ducts 99. The filter body 89 filters the fluid, which flows through the filter duct 99, and forms a filtration point 89a. A first measuring section 89b is thereby arranged upstream, thus from the view of the fluid flow quasi in front of the filter body 89. A second measuring section 89c is further arranged downstream, thus from the view of the fluid flow quasi after the filter body 89. The measuring sections 89b, 89c can each be connected to the sensor device 20, in order to evaluate for example a pressure gradient, so that for instance the filtration performance of the filter body 89 can be determined. The sensor device 20 can thereby be arranged in a cuboid, which is suggested in a dotted manner, inside, in particular completely inside, the housing base body 61.

Figure 28:
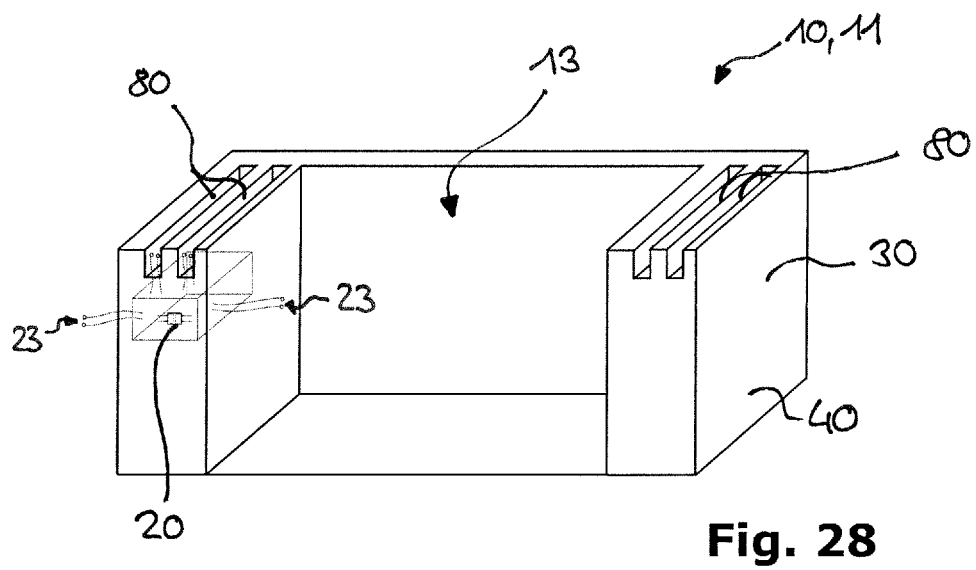
FIG. 28 shows a further perspective view of a HVAC device housing part comprising a fluid line system and a sensor device.

FIG. 28 shows a relatively simple perspective view of a housing part 40 of an HVAC device 11 comprising a fluid line system 10 having several groove arrangements 80 and a sensor device 20. The housing part 40 of the HVAC device 11 advantageously limits an installation space 13. The installation space 13 is advantageously suitable to receive air-conditioning components of the HVAC device 11, which realize an air-conditioning function of the HVAC device 11. It is obviously also conceivable that other components, which are not relevant in particular for the air-conditioning function of the HVAC device 11, are arranged in the installation space 13, for example the sensor device 20.

Figure 29:
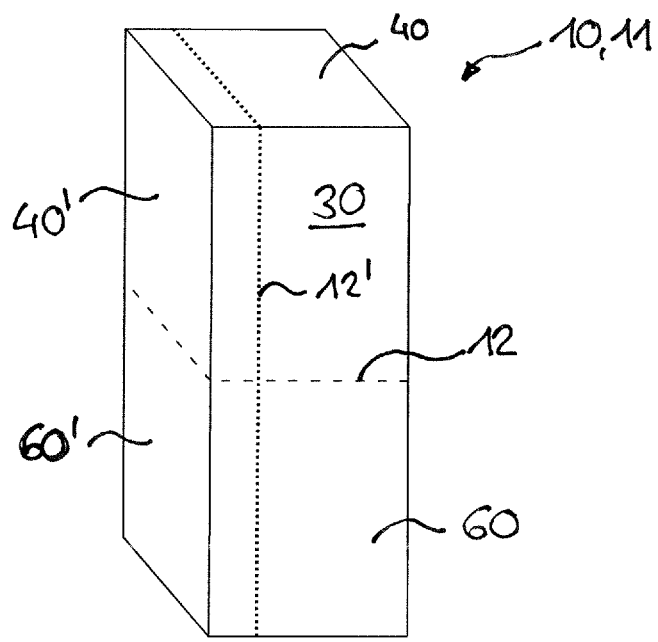
FIG. 29 shows a perspective view of a HVAC device.

An HVAC device 11, thus an air-conditioning device, is illustrated as an example in FIG. 29. It consists, for example, of several housing parts 40, 40', 60, 60', wherein each housing part 40, 40', 60, 60' has mounting surface areas, which are not illustrated in more detail. Their respective groove recesses 90 advantageously extend along longitudinal groove axes 12, 12'. As an example, a first longitudinal groove axis 12 and a second longitudinal groove axis 12', which is oriented transversely thereto, are suggested by means of dotted lines.

According to FIGS. 30, 31, 32, and 33, a further exemplary embodiment of the fluid line system 10 is in each case illustrated in a perspective view. This is preferably an HVAC device 11, in particular a housing 30 of the HVAC device 11 having several housing parts 40, 60. In contrast to the remaining exemplary embodiments, this exemplary embodiment comprises one or several mounting protrusions, which are identified with reference numeral 200 and which are each arranged on a housing 30 or on the housing parts 40, 60, respectively, of the housing 30. The mounting protrusions 200 thereby protrude in a web-like manner beyond the housing 30, see in particular FIGS. 30 and 31. Each mounting protrusion 200 consists of at least two mounting protrusion parts 201, 202, which, in the assembled state of the fluid line system 10, are arranged on top of one another in a congruent manner by forming at least one fluid duct 99, and abut against one another with contact and without gaps, see in particular FIGS. 31 and 32.

Figure 30:
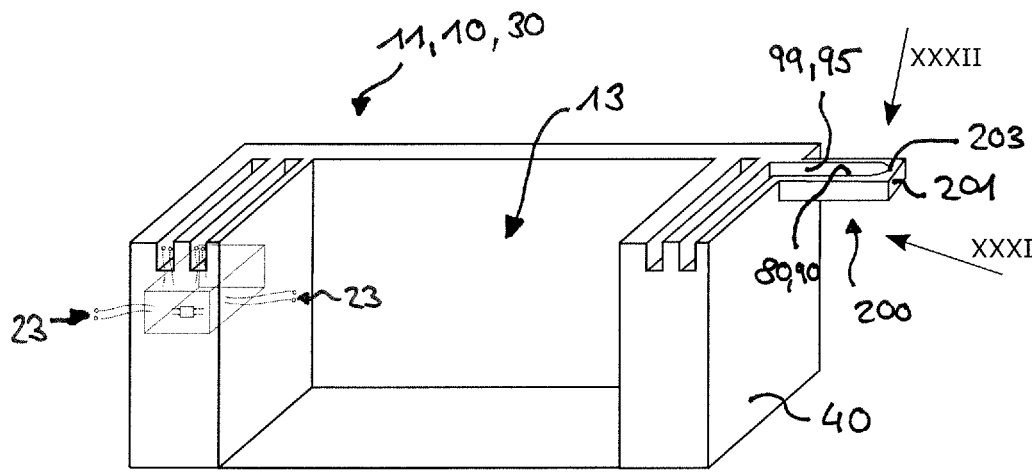
FIG. 30 shows a further exemplary embodiment of the fluid line system in a perspective view, in particular a HVAC device housing part comprising a mounting protrusion.

For clarity reasons, a single mounting protrusion part 201 is illustrated as an example in FIG. 30, which has a groove arrangement 80 or a groove recess 90, respectively, wherein the groove recess 90 opens out on a mounting surface area 203 of the mounting protrusion part 201 by forming a groove opening 95. The other mounting protrusion part 202, which is not illustrated in FIG. 30, comprises a second mounting surface area 204, which corresponds to the mounting surface area 203 of the mounting protrusion part 201, see in particular FIG. 31.

Figure 31:
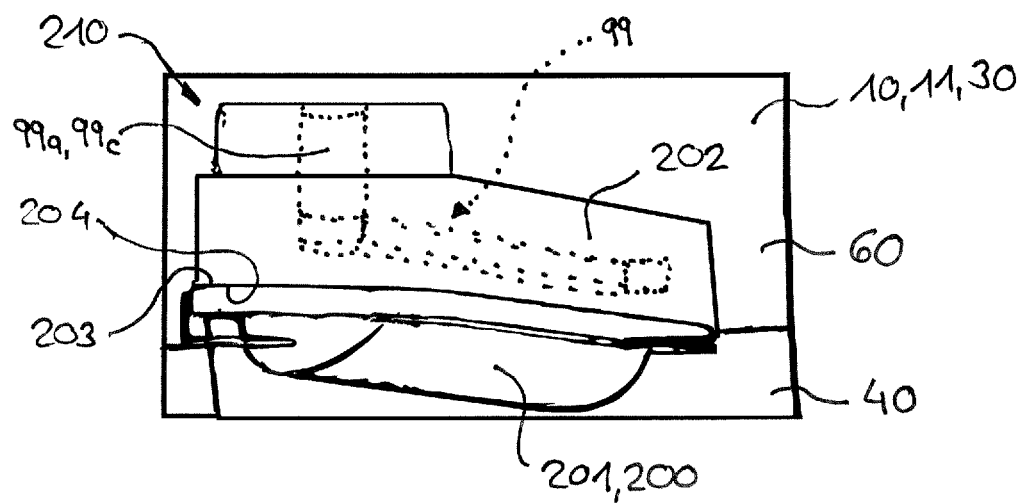
FIG. 31 shows a perspective view of the mounting protrusion from FIG. 30 according to arrow XXXI.
Figure 32:
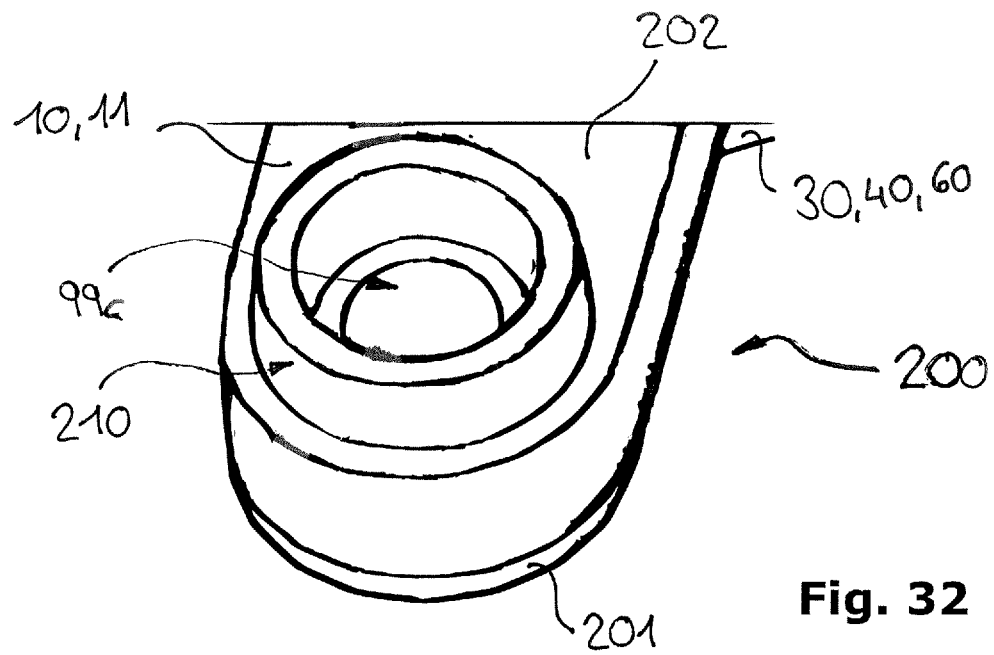
FIG. 32 shows a perspective view of the mounting protrusion from FIG. 30 according to arrow XXXII.

It can further be seen according to FIG. 31 that a mounting protrusion part 201 can be arranged on a first housing part 40 and another mounting protrusion part 202 on a second housing part 60. The mounting protrusion parts 201, 202 are thereby advantageously formed by means of a substance-to-substance bond or in a non-positive manner or integrally with the respective housing part 40, 60 of the housing 30.

Figure 33:
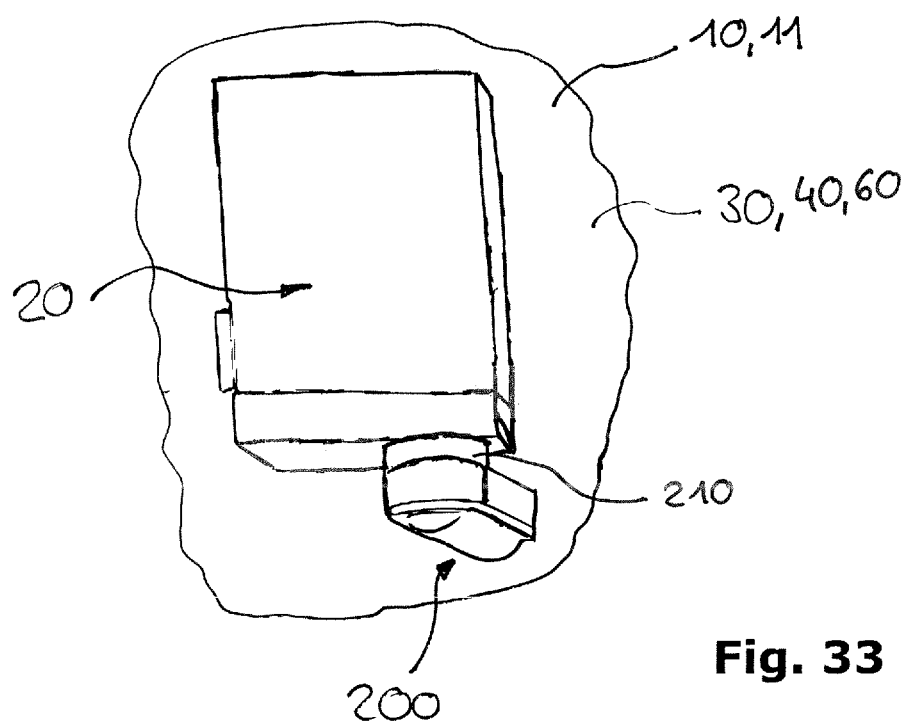
FIG. 33 shows a further perspective view of the mounting protrusion according to FIG. 30, but comprising a sensor device arranged on the mounting protrusion.

Lastly, FIG. 33 shows that at least one sensor or at least one sensor device 20 can be arranged on the mounting protrusion 200. A connecting device 210, which connects the fluid line system 10 to the sensor device 20, is thereby advantageously arranged on the mounting protrusion 200. The connecting device 210 is formed, for example, by means of a non-illustrated bayonet closure. It is attained thereby, for example, that fluid can flow through the fluid duct 99 formed on the mounting protrusion 200 through a fluid supply duct 99c to the sensor device 20.

The invention claimed is:

1. A fluid line system for guiding fluid in a HVAC device, comprising:
   a sensor device for capturing sensor parameters,
   a housing including at least two housing parts,
   wherein each of the at least two housing parts has a mounting surface area for arranging a further housing part,
   wherein the housing has a groove arrangement including at least one groove recess that is arranged on the mounting surface area of at least one of the two housing parts,
   wherein the at least one groove recess has a groove opening that opens out to the mounting surface area, and
   wherein the groove opening is closed via the mounting surface area of at least one further housing part to limit a fluid duct, through which fluid can flow and be applied to the sensor device, between the at least one groove recess and the mounting surface area.

2. The fluid line system according to claim 1, wherein the at least one groove recess includes two or more groove recesses arranged on a single housing part of the at least two housing parts, and wherein the respective groove openings of the two or more groove recesses each open out at the mounting surface area of the single housing part and are closed by a mounting surface area of at least one further housing part of the at least two housing parts to provide two or more fluid ducts, through which fluid can flow.

3. The fluid line system according to claim 1, wherein the at least two housing parts each have a single or two or more groove recesses arranged thereon, the respective groove openings of which open out at the mounting surface area of the respective one of the at least two housing parts and are closed by the mounting surface area of at least one further housing part to provide a single or two or more fluid ducts, through which fluid can flow.

4. The fluid line system according to claim 1, wherein:
two housing parts are provided that each have a single or several groove recesses arranged thereon, the respective groove openings of which open out at the mounting surface area of the respective one of the two housing parts, and
the single or several groove recesses of the two housing parts are arranged on the respective mounting surface areas located opposite to one another in pairs such that a respective groove recess of one of the two housing parts and a further respective groove recess of a further one of the two housing parts together define the fluid duct, through which fluid can flow.

5. The fluid line system according to claim 1, wherein two or more fluid ducts are provided, in each case combined in pairs, that open out into a measuring section arranged on the housing for sucking in and blowing out fluid, and a sensor supply section for providing fluid on the sensor device.

6. The fluid line system according to claim 5, further comprising at least one of:
at least two fluid connections for connecting a fluid supply device or fluid supply points for sucking in and blowing out fluid arranged on the measuring section, wherein each of the at least two fluid connections are fluidically connected to a single fluid duct, and
a fluidic connection provided between a fluid duct and a fluid connection via a fluid connecting duct, that extends through a respective one of the at least two housing parts.

7. The fluid line system according to claim 6, wherein at least one of:
at least one of the fluid supply points has a nozzle-shaped measuring tapping body, structured and arranged to tap supply air or exhaust air or a combination of supply air and exhaust air from a surrounding atmosphere, and
a measuring tapping body comprising a cylindrical hollow body is arranged on the housing such that fluid can flow through an open flow cross section thereof via a fluid connecting duct to the fluid duct.

8. The fluid line system according to claim 1, wherein:
the at least one groove recess includes a duct separating body arranged therein that separates the at least one groove recess into two or more chambers, which are separated from one another, and
the groove opening of the at least one groove recess is closed by the mounting surface area of at least one further housing part of the at least two housing parts such that two or more fluid ducts, through which fluid can flow and which can be operated separately from one another, are limited between the at least one groove recess and the respective mounting surface area and the duct separating body, so that two or more fluid flows, which are independent of one another, can each be guided through the at least one groove recess.

9. The fluid line system according to claim 1, wherein at least one of:
a duct separating body is provided that is an elastic tubular soft body of plastic material and has a circular cross section and during operation abuts against groove flanks and a groove base of the at least one groove recess and the mounting surface area all around in a fluid-tight manner like a seal, and
a duct separating body is provided that defines a longitudinal duct body axis, with respect to which the duct separating body has a completely continuous H-shaped or E-shaped cross section.

10. The fluid line system according to claim 1, further comprising a support body for at least one of supporting a sealing function of a sealing body inserted into the fluid duct and supporting a duct separating body, is inserted or can be inserted into the at least one groove recess, wherein the support body is a flat body that extends longitudinally through the at least one groove recess.

11. The fluid line system according to claim 10, wherein the support body is inserted into the at least one groove recess and tensioned against a duct separating body, so that the duct separating body is pressed and fixed against groove flanks and a groove base of the at least one groove recess, and separates the at least one groove recess into two separate fluid ducts, through which fluid can flow.

12. The fluid line system according to claim 1, further comprising at least one of:
a sealing body that abuts against the respective mounting surface areas and the groove opening to form a seal, arranged between at least two mounting surface areas that abut against one another with contact, to seal the fluid duct,
a sealing body inserted as an insert into the at least one groove recess, and
a sealing body molded onto at least one of the respective mounting surface areas as an injection molded part and provides a surface coating.

13. The fluid line system according to claim 1, further comprising a filter body arranged in the fluid duct and oriented transversely to the fluid flow for filtering the fluid that flows through the fluid duct, wherein the fluid duct opens out at a first measuring section arranged on the housing and arranged downstream with respect to a filtration point, and a second measuring section arranged upstream with respect to the filtration point, wherein the sensor device is arranged on the first measuring section and the second measuring section to measure a pressure gradient between the first measuring section and the second measuring section for detecting a filtration performance.

14. The fluid line system according to claim 1, further comprising at least one of:
one or several positioning protrusions, extending along the mounting surface area for mutually aligning the at least two housing parts relative to one another, are arranged on at least one of the housing parts, wherein, starting at the mounting surface area, at least one positioning protrusion protrudes into the groove opening of a groove recess of an opposite housing part to define the fluid duct, and
a positioning protrusion, starting at the mounting surface area, extends through the groove opening up to a groove base, and abuts against the groove base with elastic contact, so that the positioning protrusion separates the at least one groove recess into two separate fluid ducts separated from one another so that two independent fluid flows can be guided through the at least one groove recess.

15. The fluid line system according to claim 1, further comprising a locking arrangement arranged on the at least two housing parts, structured and arranged to clamp the at least two housing parts to one another, wherein a plurality of locking seats are arranged on a first housing part and a plurality of corresponding locking lugs are arranged on a second housing part, and wherein the plurality of locking lugs engage with and clamp the plurality of locking seats during operation.

16. The fluid line system according to claim 1, wherein at least one of:
- the sensor device is arranged on a respective one of the at least two housing parts and is supplied with fluid via fluid ducts that are each combined in pairs, wherein the fluid of a fluid duct pair is tapped by a surrounding atmosphere surrounding, and wherein the fluid of another fluid duct pair is tapped by a further surrounding atmosphere,
- the sensor device has a sensor housing fastened to a respective one of the at least two housing parts, and a sensor supply section, and
- the sensor device has a sensor housing arranged inside the housing, or the sensor device has a sensor housing arranged in an intermediate housing, wherein the intermediate housing has two mounting surfaces, which are oppositely oriented and on which the at least two housing parts are arranged by defining at least two fluid ducts, so that the intermediate housing is stretched between the at least two housing parts in a sandwich-like manner.

17. An air-conditioning device, for a motor vehicle, comprising: a fluid line system, the fluid line system including:
- a sensor device for capturing sensor parameters,
- a housing including at least two housing parts each having a mounting surface area for arranging a further housing part,
- the housing having a groove arrangement including at least one groove recess that is arranged on the mounting surface area of at least one of the two housing parts,
- the at least one groove recess having a groove opening that opens out to the mounting surface area, and
- wherein the groove opening is closed via the mounting surface area of at least one further housing part to provide a fluid duct, through which fluid can flow and be applied to the sensor device, between the at least one groove recess and the mounting surface area.

18. The air-conditioning device according to claim 17, wherein the at least one groove recess includes a duct separating body, structured and arranged to separate the at least one groove recess into at least two chambers separated from one another.

19. The air-conditioning device according to claim 18, wherein the duct separating body has an elastic tubular soft body of plastic material with a closed circular cross section.

20. The air-conditioning device according to claim 17, further comprising a filter body arranged in the fluid duct.

* * * * *